United States Patent
Wei et al.

(10) Patent No.: US 12,256,372 B2
(45) Date of Patent: Mar. 18, 2025

(54) METHOD AND DEVICE FOR MULTICAST BROADCAST SERVICE ACQUISITION

(71) Applicant: SHARP KABUSHIKI KAISHA, Sakai (JP)

(72) Inventors: Chia-Hung Wei, Taipei (TW);
Hai-Han Wang, Taipei (TW);
Hung-Chen Chen, Taipei (TW);
Heng-Li Chin, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 343 days.

(21) Appl. No.: 17/733,018

(22) Filed: Apr. 29, 2022

(65) Prior Publication Data
US 2022/0361161 A1    Nov. 10, 2022

Related U.S. Application Data

(60) Provisional application No. 63/185,927, filed on May 7, 2021, provisional application No. 63/181,959, filed on Apr. 29, 2021.

(51) Int. Cl.
*H04W 72/04* (2023.01)
*H04L 5/00* (2006.01)
(Continued)

(52) U.S. Cl.
CPC ......... *H04W 72/046* (2013.01); *H04L 5/0053* (2013.01); *H04W 72/30* (2023.01)

(58) Field of Classification Search
None
See application file for complete search history.

(56) References Cited

U.S. PATENT DOCUMENTS

2021/0037500 A1   2/2021  Liu et al.
2021/0392467 A1 * 12/2021  Kim ................. H04L 1/1861
(Continued)

FOREIGN PATENT DOCUMENTS

CN     112087720     12/2020

OTHER PUBLICATIONS

Xiaomi Communications, "Remaining issues of MCCH and MCCH change notification", 3GPP TSG-RAN WG2 Meeting #113bis electronic, E-Meeting, Apr. 12-Apr. 20, 2021, R2-2104229.
(Continued)

*Primary Examiner* — Sai Aung
(74) *Attorney, Agent, or Firm* — ScienBiziP, P.C.

(57) ABSTRACT

A method for MBS acquisition is provided. The method includes receiving system information from a BS; determining a first CORESET configuration and a second CORESET configuration according to the system information, the first CORESET configuration determining a first set of CORESETs scheduling at least one MCCH, the second CORESET configuration determining a second set of CORESETs scheduling a plurality of MTCHs; receiving an MCCH message on the at least one MCCH provided through a first beam of a plurality of beams associated with the BS; and determining, according to the second CORESET configuration and the MCCH message, a plurality of MBS-specific CORESET groups in the second set of CORESETs, wherein each of the plurality of MBS-specific CORESET groups corresponds to a respective MBS session and includes at least two CORESETs configured to be provided through at least two different beams of the plurality of beams. A UE using the method is also provided.

12 Claims, 18 Drawing Sheets

(51) Int. Cl.
*H04W 72/00* (2023.01)
*H04W 72/044* (2023.01)
*H04W 72/30* (2023.01)

(56) References Cited

U.S. PATENT DOCUMENTS

| | | | |
|---|---|---|---|
| 2023/0239123 A1* | 7/2023 | Zhou | H04L 5/0023 |
| | | | 370/329 |
| 2023/0345430 A1* | 10/2023 | Takeda | H04W 72/0446 |
| 2024/0063878 A1* | 2/2024 | Li | H04W 72/232 |
| 2024/0073703 A1* | 2/2024 | Li | H04B 7/06952 |
| 2024/0154766 A1* | 5/2024 | Liu | H04L 5/0094 |

OTHER PUBLICATIONS

OPPO, "Discussion on beam sweeping transmission for delivery mode 2", 3GPP TSG-RAN WG2 Meeting #113 bis electronic, Online, Apr. 12-Apr. 20, 2021, R2-2102893.

3GPP TS 38.214, "3rd Generation Partnership Project; Technical Specification Group Radio Access Network; NR; Physical layer procedures for data (Release 15)", V15.12.0 (Mar. 2021).

3GPP TS 38.321, "3rd Generation Partnership Project; Technical Specification Group Radio Access Network; NR; Medium Access Control (MAC) protocol specification (Release 15)", V15.12.0 (Mar. 2021).

3GPP TS 38.331, "3rd Generation Partnership Project; Technical Specification Group Radio Access Network; NR; Radio Resource Control (RRC) protocol specification (Release 15)", V15.13.0 (Mar. 2021).

* cited by examiner

METHOD AND DEVICE FOR MULTICAST BROADCAST SERVICE ACQUISITION

CROSS-REFERENCE TO RELATED APPLICATION(S)

The present disclosure claims the benefit of and priority to U.S. Provisional Patent Application Ser. No. 63/181,959, filed on Apr. 29, 2021, entitled "MBS DATA SCHEDULING ON BEAM-BASED CONTROL CHANNEL" (hereinafter "the '959 provisional") and U.S. Provisional Patent Application Ser. No. 63/185,972, filed on May 7, 2021, entitled "MBS DATA ACQUISITION ON MULTICAST TRAFFIC CHANNEL" (hereinafter "the '972 provisional"). The contents of the '959 provisional and the '972 provisional are hereby incorporated fully by reference into the present disclosure for all purposes.

FIELD

The present disclosure generally relates to wireless communication and, more particularly, to methods and devices for Multicast/Broadcast Service (MBS) acquisition.

BACKGROUND

With the tremendous growth in the number of connected devices and the rapid increase in user/network traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize network services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in next-generation wireless communication systems.

SUMMARY

The present disclosure is directed to methods and devices for MBS acquisition.

According a first aspect of the present disclosure, a method performed by a User Equipment (UE) for Multicast/Broadcast Service (IVIES) acquisition is provided. The method includes receiving system information from a Base Station (BS); determining a first Control Resource Set (CORESET) configuration and a second CORESET configuration according to the system information, the first CORESET configuration determining a first set of CORESETs scheduling at least one Multicast Control Channel (MCCH), the second CORESET configuration determining a second set of CORESETs scheduling a plurality of Multicast Traffic Channels (MTCHs); receiving an MCCH message on the at least one MCCH provided through a first beam of a plurality of beams associated with the BS; and determining, according to the second CORESET configuration and the MCCH message, a plurality of MBS-specific CORESET groups in the second set of CORESETs, wherein each of the plurality of MBS-specific CORESET groups corresponds to a respective MBS session and includes at least two CORESETs configured to be provided through at least two different beams of the plurality of beams.

In some implementations of the first aspect of the present disclosure, a first MBS-specific CORESET group of the plurality of MBS-specific CORESET groups schedules a first set of the plurality of MTCHs for receiving data associated with a first MBS session, and a second MBS-specific CORESET group of the plurality of MBS-specific CORESET groups schedules a second set of the plurality of MTCHs for receiving data associated with a second MBS session.

In some implementations of the first aspect of the present disclosure, the method further includes receiving the data associated with the first MBS session on a first MTCH of the first set of the plurality of MTCHs, the first MTCH being provided through a second beam of the plurality of beams; and receiving the data associated with the second MBS session on a second MTCH of the second set of the plurality of MTCHs, the second MTCH being provided through a third beam of the plurality of beams, wherein the first beam is different from at least one of the second beam and the third beam.

In some implementations of the first aspect of the present disclosure, the first beam corresponds to a first Synchronization Signal Block (SSB) with a first index, and the second beam corresponds to a second SSB with a second index that is different from the first index.

In some implementations of the first aspect of the present disclosure, the first beam corresponds to a first Synchronization Signal Block (SSB) with a first index, and the third beam corresponds to a second SSB with a second index that is the same as the first index.

In some implementations of the first aspect of the present disclosure, each of the plurality of MBS-specific CORESET groups is within a respective MTCH transmission window determined from the MCCH message.

In some implementations of the first aspect of the present disclosure, each of the plurality of beams corresponds to a respective Synchronization Signal Block (SSB) received from the BS within a beam-sweeping cycle.

According to a second aspect of the present disclosure, a User Equipment (UE) for Multicast/Broadcast Service (MBS) acquisition is provided. The UE includes transmission and reception circuitry and at least one processor coupled to the transmission and reception circuitry. The at least one processor is configured to receive, by the transmission and reception circuitry, system information from a Base Station (BS); determine a first Control Resource Set (CORESET) configuration and a second CORESET configuration according to the system information, the first CORESET configuration determining a first set of CORESETs scheduling at least one Multicast Control Channel (MCCH), the second CORESET configuration determining a second set of CORESETs scheduling a plurality of Multicast Traffic Channels (MTCHs); receive, by the transmission and reception circuitry, an MCCH message on the at least one MCCH provided through a first beam of a plurality of beams associated with the BS; and determine, according to the second CORESET configuration and the MCCH message, a plurality of MBS-specific CORESET groups in the second set of CORESETs, wherein each of the plurality of MBS-specific CORESET groups corresponds to a respective MBS session and includes at least two CORESETs configured to be provided through at least two different beams of the plurality of beams.

In some implementations of the second aspect of the present disclosure, a first MBS-specific CORESET group of the plurality of MBS-specific CORESET groups schedules a first set of the plurality of MTCHs for receiving data associated with a first MBS session, and a second MBS-specific CORESET group of the plurality of MBS-specific CORESET groups schedules a second set of the plurality of MTCHs for receiving data associated with a second MBS session.

In some implementations of the second aspect of the present disclosure, the at least one processor is further configured to receive, by the transmission and reception circuitry, the data associated with the first MBS session on a first MTCH of the first set of the plurality of MTCHs, the first MTCH being provided through a second beam of the plurality of beams; and receive, by the transmission and reception circuitry, the data associated with the second MBS session on a second MTCH of the second set of the plurality of MTCHs, the second MTCH being provided through a third beam of the plurality of beams, wherein the first beam is different from at least one of the second beam and the third beam.

In some implementations of the second aspect of the present disclosure, the first beam corresponds to a first Synchronization Signal Block (SSB) with a first index, and the second beam corresponds to a second SSB with a second index that is different from the first index.

In some implementations of the second aspect of the present disclosure, the first beam corresponds to a first Synchronization Signal Block (SSB) with a first index, and the third beam corresponds to a second SSB with a second index that is the same as the first index.

In some implementations of the second aspect of the present disclosure, each of the plurality of MBS-specific CORESET groups is within a respective MTCH transmission window determined from the MCCH message.

In some implementations of the second aspect of the present disclosure, each of the plurality of beams corresponds to a respective Synchronization Signal Block (SSB) received from the BS within a beam-sweeping cycle.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
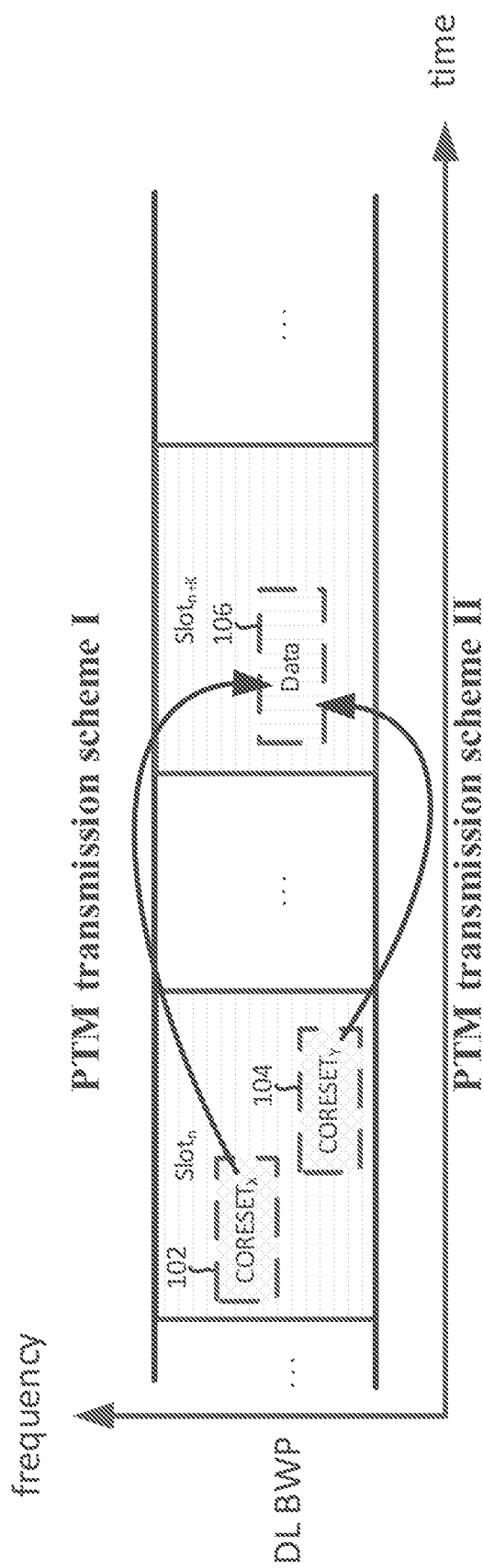
FIG. 1 is a diagram that illustrates an example of applying a PTM transmission scheme I and a PTM transmission scheme II, according to an implementation of the present disclosure.

The acronyms in the present application are defined as follows and, unless otherwise specified, the acronyms have the following meanings:

| Acronym | Full name |
| --- | --- |
| 3GPP | 3rd Generation Partnership Project |
| 5G | 5th generation |
| 5GS | 5G System |
| ACK | Acknowledgement |
| AM | Acknowledgement Mode |
| AS | Access Stratum |
| ARQ | Automatic Repeat Request |
| BCCH | Broadcast Control Channel |
| BL | Bandwidth reduced Low complexity |
| BS | Base Station |
| BSR | Buffer Status Report |
| BWP | Bandwidth Part |
| CA | Carrier Aggregation |
| CC | Component Carriers |

-continued

| Acronym | Full name |
| --- | --- |
| CCCH | Common Control Channel |
| CE | Control Element |
| CG | Cell Group |
| CN | Core Network |
| CORESET | Control Resource Set |
| C-RNTI | Cell Radio Network Temporary Identifier |
| CS-RNTI | Configured Scheduling Radio Network Temporary Identifier |
| CRC | Cyclic Redundancy Check |
| CSI-RS | Channel State Information Reference Signal |
| CSS | Common Search Space |
| DC | Dual Connectivity |
| DCI | Downlink Control Information |
| DL | Downlink |
| DL-SCH | Downlink Shared Channel |
| DRB | Data Radio Bearer |
| DRX | Discontinuous Reception |
| DTCH | Dedicated Traffic Channel |
| E-UTRA | Evolved Universal Terrestrial Radio Access |
| E-UTRAN | Evolved Universal Terrestrial Radio Access Network |
| EN-DC | E-UTRA NR Dual Connect |
| FDD | Frequency Division Duplexing |
| G-RNTI | Group Radio Network Temporary Identifier |
| HARQ | Hybrid Automatic Repeat Request |
| IE | Information Element |
| L1 | Layer 1 |
| LCG | Logical Channel Group |
| LCH | Logical Channel |
| LCID | Logical Channel Identity |
| LTE | Long Term Evolution |
| MAC | Medium Access Control |
| MBMS | Multimedia Broadcast/Multicast Service |
| MBS | Multicast/Broadcast Service |
| MBSFN | Multicast/Broadcast Single Frequency Network |
| MCE | Multi-cell/Multicast Coordination Entity |
| MCG | Master Cell Group |
| MCH | Multicast Channel |
| MCCH | Multicast Control Channel |
| SC-MCCH | Single Cell Multicast Control Channel |
| MRB | MBS Radio Bearer |
| MR-DC | Multi-RAT Dual Connectivity |
| MSG | Message |
| MTCH | Multicast Traffic Channel |
| MCS-C-RNTI | Modulation Coding Scheme Cell Radio Network Temporary Identifier |
| NB-IoT | Narrow Band Internet of Things |
| NDI | New Data Indicator |
| NR | New RAT/Radio |
| NUL | Normal Uplink |
| NW | Network |
| PBCH | Physical Broadcast Channel |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PSCell | Primary SCell |
| PTM | Point-to-Multipoint |
| PTP | Point-to-Point |
| PUCCH | Physical Uplink Control Channel |
| PUSCH | Physical Uplink Shared Channel |
| RA | Random Access |
| RAT | Radio Access Technology |
| RLC | Radio Link Control |
| RSRP | Reference Signal Received Power |
| RNTI | Radio Network Temporary Identifier |
| RRC | Radio Resource Control |
| SCell | Secondary Cell |
| SCG | Secondary Cell Group |
| SC-MCCH | Single Cell Multicast Control Channel |
| SC-MTCH | Single Cell Multicast Traffic Channel |
| SC-PTM | Single Cell Point to Multipoint |
| SC-MRB | Single Cell Multimedia Broadcast Multicast Service Point to Multipoint Radio Bearer |
| SC-RNTI | Single Cell Radio Network Temporary Identifier |

-continued

| Acronym | Full name |
| --- | --- |
| SDAP | Service Data Adaptation Protocol |
| SDU | Service Data Unit |
| SIB | System Information Block |
| SLIV | Start and Length Indicator Value |
| SSB | Synchronization Signal Block |
| SR | Scheduling Request |
| SRB | Signaling Radio Bearer |
| SpCell | Special Cell |
| SPS | Semi Persistent Scheduling |
| SUL | Supplementary Uplink |
| TA | Timing Advance |
| TAG | Timing Advance Group |
| TB | Transport Block |
| TDD | Time Division Duplexing |
| TMGI | Temporary Mobile Group Identity |
| TR | Technical Report |
| TRP | Transmission/Reception Point |
| TS | Technical Specification |
| UE | User Equipment |
| UL | Uplink |
| UL-SCH | Uplink Shared Channel |
| UM | Unacknowledged Mode |
| USS | UE-Specific search space |
| WI | Work Item |

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in some implementations" or "in one example" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UNITS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

Examples of some selected terms are provided as follows.

Cell: Radio network object that can be uniquely identified by a User Equipment from a (cell) identification that is broadcasted over a geographical area from one UTRAN Access Point. A Cell is either FDD or TDD mode.

Serving Cell: For a UE in an RRC_CONNECTED state not configured with CA/DC, there is only one serving cell which is the primary cell. For a UE in an RRC_CONNECTED state configured with CA/DC, the term 'serving cells' is used to denote a set of cells including the Special Cell(s) and all secondary cells.

CA: In Carrier Aggregation (CA), two or more Component Carriers (CCs) are aggregated. A UE may simultaneously receive or transmit on one or multiple CCs depending on its capabilities. CA is supported for both contiguous and non-contiguous CCs. When CA is deployed frame timing and SFN are aligned across cells that can be aggregated. The maximum number of configured CCs for a UE is 16 for DL and 16 for UL. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore always consists of one PCell and one or more SCells.

BWP: A subset of the total cell bandwidth of a cell is referred to as a Bandwidth Part (BWP) and BA is achieved by configuring the UE with BWP(s) and telling the UE which of the configured BWPs is currently the active one. To enable Bandwidth Adaptation (BA) on the PCell, the gNB configures the UE with UL and DL BWP(s). To enable BA on SCells in the case of CA, the gNB configures the UE with DL BWP(s) at least (e.g., there may be none in the UL). For the PCell, the initial BWP is the BWP used for initial access. For the SCell(s), the initial BWP is the BWP configured for the UE to first operate at SCell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon MAC-activation of an SCell.

Timer: A MAC entity can setup one or more timers for individual purposes, for example, triggering some uplink signaling retransmission or limiting some uplink signaling retransmission period. A timer is running once it is started, until it is stopped or until it expires; otherwise, it is not running. A timer can be started if it is not running or restarted if it is running. A Timer may be started or restarted from its initial value. The initial value may be, but is not limited to be, configured by the gNB via downlink RRC signaling or may be pre-defined/pre-determined value addressed in some specification.

PDCCH: In the downlink, the gNB can dynamically allocate resources to UEs at least via the C-RNTI/MCS-C-RNTI/CS-RNTI on PDCCH(s). A UE may monitor the PDCCH(s) in order to find possible assignments when its downlink reception is enabled (activity governed by DRX when configured). When CA is configured, the same C-RNTI may apply to all serving cells.

PDSCH/PUSCH: The PDCCH can be used to schedule DL transmissions on PDSCH and UL transmissions on PUSCH.

Transport Block: The data from the upper layer (or MAC) given to the physical layer is basically referred as a transport block.

HARQ: A functionality ensures delivery between peer entities at Layer 1 (e.g., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each HARQ entity supports a parallel number of DL and UL HARQ processes.

Hybrid automatic repeat request acknowledgement (HARQ-ACK): A HARQ-ACK information bit value of 0 represents a negative acknowledgement (NACK) while a HARQ-ACK information bit value of 1 represents a positive acknowledgement (ACK).

The terms, definitions and abbreviations as given in this document are either imported from existing documentation (European Telecommunications Standards Institute (ETSI), International Telecommunication Union (ITU), or elsewhere) or newly created by 3GPP experts whenever the need for precise vocabulary is identified.

It is noted that the "beam" mentioned within this disclosure is equivalent to a spatial (domain) filtering. In one example, the spatial filtering is applied in the analog domain by adjusting phase and/or amplitude of the signal before being transmitted by a corresponding antenna element. In another example, the spatial filtering is applied in the digital domain by a Multi-input Multi-output (MIMO) technique in wireless communication systems. For example, "a UE made a PUSCH transmission by using a specific beam" means "the UE made the PUSCH transmission by using a specific spatial/digital domain filter." The "beam" may also be, but is not limited to be, represented as an antenna, an antenna port, an antenna element, a group of antennas, a group of antenna ports, or a group of antenna elements. The beam may also be formed by a certain reference signal resource. In brief, the beam can be equivalent to a spatial domain filter through which the electromagnetic (EM) wave is radiated.

Worldwide telecommunication standard development organization(s), led by 3GPP, introduced Multimedia Broadcast/Multicast Services (MBMS) for Long Term Evolution (LTE) cellular wireless communication systems in earlier releases based on a standardized point-to-multipoint (PTM) interface. The MBMS was introduced for providing an efficient way to broadcast and multicast data (or packet) delivery, either within a cell (via single cell point-to-multipoint (SC-PTM)) or within multiple cells (via a Multimedia Broadcast/Multicast Service Single Frequency Network (MBSFN)) belonging to the same core network.

From the Access-Stratum (AS) layer perspective, the data processing flow designed for MBMS data had significant differences from the unicast procedure used in legacy systems. For example, the multicast data transmission may be delivered through MBMS-specific logical channels that are isolated from logical channel(s) configured for normal data process (e.g., delivery and reception). That is, to support MBMS on a UE, the UE should be (pre)configured with a particular MBMS configuration for at least its protocol stack (e.g., RRC, PDCP, RLC, MAC and PHY layer). For example, the UE may be configured with a control channel (a.k.a. Multicast Control Channel (MCCH)) and a traffic channel (a.k.a. Multicast Traffic Channel (MTCH)) in case that the supported MBMS is provided in multiple cells belong to a single core network. Similarly, the UE may be configured with a control channel (a.k.a. Single-Cell Multicast Control Channel (SC-MCCH)) and a traffic channel (a.k.a. Single-Cell Multicast Traffic Channel (SC-MTCH)) in case that the supported MBMS is provided within a cell. The MCCH and SC-MCCH may be point-to-multipoint downlink channels used for transmitting MBMS control information from the network to the UE, for one or several MTCHs and SC-MTCHs. The MTCH and SC-MTCH are point-to-multipoint downlink channels for transmitting traffic data from the network (e.g., eNB) to the UE.

In a New Radio (NR) wireless communication system, a downlink data reception at the UE side may be achieved by monitoring a physical downlink control channel (PDCCH) and find possible assignment. The assignment may be represented by (UE-specific) downlink control information (DCI) that may be found on a PDCCH via blind decoding. From the aspect of implementing blind decoding, the UE may be configured with a set of PDCCH candidates within one or more CORESETs. The PDCCH candidate set for the UE to monitor may be defined in view of PDCCH search space sets (or search space sets). Each (PDCCH) search space set can be categorized into two types (e.g., either a Common Search space (CSS) set or a UE-Specific Search Space (USS) set). That is, a UE monitors PDCCH candidates according to one or more configured search spaces sets to decode the possible PDCCH transmitted by the gNB. In other words, a PDCCH may be found in the PDCCH candidates within the monitored search space sets. Further, the UE may monitor a set of PDCCH candidates in one or more CORESETs and/or Search Spaces on a DL BWP (e.g., the active DL BWP on each activated serving cell or the initial BWP on a camped cell) configured with PDCCH monitoring according to corresponding search space sets. The term "PDCCH monitoring" may refer to decoding each PDCCH candidate according to the monitored DCI formats. That is, the DCI with CRC bits scrambled by a UE-specific RNTI (e.g., C-RNTI) is carried out by the PDCCH, and the DCI can be received/decoded by the UE by descrambling the CRC bits with the RNTI.

As mentioned above, a UE monitors PDCCH candidates within one or more CORESETs. The CORESET may refer to a specific radio resource indicated by the gNB via one or more configurations (e.g., ControlResourceSet information element (IE)). The one or more configurations may be transmitted by the gNB to the UE via one or more broadcast system information blocks (SIBs) or dedicated (unicast) signaling. The particular width in the frequency domain and the particular width in the time domain of a CORESET may be indicated by a CORESET configuration (e.g., ControlResourceSet IE). In the time domain, the CORESET may periodically appear due to the allocation of the gNB. The exact positions of the CORESETs in the time domain may be preconfigured by the gNB to the UE through a search space configuration (e.g., SearchSpace IE). Each ControlResourceSet may be indexed with a CORESET ID which is carried in the ControlResourceSet IE itself. Similarly, each SearchSpace may be indexed with a Search space ID which is carried by the SearchSpace IE itself. Meanwhile, for each of configured SearchSpaces IE, it may be associated with one ControlResourceSet IE which is indicated through the SearchSpaces IE. Hence, by providing the associated ControlResourceSet IE and SearchSpaces IE to the UE, the gNB notifies the UE where to monitor the CORESET(s) for PDCCH monitoring.

As mentioned earlier, each search space may be further be categorized as CSS or USS, which is indicated by the gNB to the UE via a corresponding SearchSpace. The UE may be indicated with multiple of search spaces, each of which may be applied by the gNB for different purposes (for example, a SearchSpace for the purpose of random access and another SearchSpace for the purpose of normal data transmission/reception assignment).

According to the normative work for MBS in 3GPP Radio Access Network (RAN) Working Group 1 and 2 (e.g., RAN1 and RAN2), the use of a Multicast Control Channel (MCCH) and a Multicast Traffic Channel (MTCH) is one of the candidate architectures to be introduced for increasing flexibility of MBS data scheduling. Specifically, a UE may be configured by the gNB with an MCCH and an MTCH for receiving control information and MBS data, respectively. Once the MCCH is configured, the gNB instructs, through the control information, a UE to perform PDCCH monitoring for potential scheduling for MBS data reception transmitted on the MTCH. 3GPP defines a beam management mechanism for exploring the NR to be operated in Frequency Range 2 (FR2) for which multiple beams may be configured for both gNB and UE sides. However, in the conventional wireless communication system, it is still not clear how MBS data is scheduled on the MCCH and the MTCH under the circumstances of multi-beam operations. For example, how the PDCCH occasion(s) for monitoring the MCCH and the MTCH may be configured by the gNB while the transmission beam (e.g., a DL beam of the gNB) may be dynamically changed. Such a scenario may create challenges as to how a gNB efficiently provides PDCCH-related configuration corresponding to the MCCH and the MTCH to a UE that is interested in receiving the MBS service.

In some aspects of the present invention, the mechanism for supporting MBS data scheduling on a beam-based control channel is provided:

Configuration for MBS Data Delivery

NR supports three transmission methods that may be applied by the gNB for MBS data delivery. Depending on which type of RNTI is applied by the gNB on a DL assignment and depending on whether the DL assignment corresponding MBS data reception on the PDSCH is solely scheduled for a single UE or multiple UEs, there are three types of data delivery schemes which are listed as below:

(1) Point-to-Point (PTP) transmission: Similar to legacy unicast data transmission, the gNB may perform the DL MBS data assignment via a UE-specific RNTI (e.g., C-RNTI) in the PTP transmission scheme. Since the data is indicated by the C-RNTI, the scheduled data may be solely monitored and received by a single UE. For RRC_CONNECTED UEs (e.g., UEs operated in the RRC connected state), DCI with CRC bits scrambled by the UE-specific RNTI (e.g., C-RNTI) may be used, where the DCI may be transmitted on a UE-specific PDCCH to schedule a UE-specific PDSCH reception that is scrambled by the same UE-specific RNTI.

(2) Point-to-Multipoint (PTM) transmission scheme I: In this transmission scheme, the gNB may perform the DL MBS data assignment via a particular type of RNTI, and a single copy of the DL data, which is identified by the particular type of RNTI, may be received by a group of UEs. For example, the gNB may transmit DCI with CRC bits scrambled by a group-common RNTI (e.g., G-RNTI) to a group of RRC_CONNECTED UEs in the same MBS group. The DCI may be transmitted on a group-common PDCCH that schedules a group-common PDSCH reception scrambled by the same group-common RNTI. This scheme is also be referred to as a group-common PDCCH-based group scheduling scheme.

(3) PTM transmission scheme II: In this transmission scheme, the gNB may perform DL MBS data assignment via a particular type of RNTI, where a single copy of the DL data, which is identified by the particular type of RNTI, may be received by a group of UEs. For example, the gNB may transmit DCI with CRC bits scrambled by a UE-specific RNTI (e.g., C-RNTI) to a group of RRC_CONNECTED UEs in the same MBS group, where the DCI may be transmitted on a UE-specific PDCCH that schedules a group-common PDSCH reception scrambled with a group-common RNTI. This scheme is also be referred to as a UE-specific PDCCH-based group scheduling scheme. In some implementations, the DCI may include an indication that the scheduled PDSCH is scrambled by a group-common RNTI (e.g., G-RNTI). The indication may be carried by an explicit DCI field or by specific information carried in other DCI fields. For example, the UE may determine that the scheduled PDSCH is scrambled by a group-common RNTI if the frequency resource allocated for the PDSCH is on a BWP (or a common frequency resource) configured for a PDSCH scrambled by a group-common RNTI. In another example, the UE may determine that the scheduled PDSCH is scrambled by a group-common RNTI if a field indicates the group-common RNTI, wherein the field includes an index to a list of one or more group common RNTIs. The list may further include a C-RNTI.

FIG. 1 is a diagram that illustrates an example of applying PTM transmission scheme I and PTM transmission scheme II, according to an implementation of the present disclosure.

In FIG. 1, the UE may be configured by the gNB to perform PDCCH monitoring on two CORESETs (e.g., $CORESET_X$ 102 and $CORESET_Y$ 104) in the same slot (e.g., $slot_n$). In NR, the UE's behavior of PDCCH monitoring on a CORESET may configured via a particular CORESET configuration (e.g., received from System Information Block 1 (SIB1) or DL RRC signaling). $CORESET_X$ 102 may be configured by the gNB for monitoring a group-common PDCCH. $CORESET_Y$ 104 may be configured by the gNB for monitoring a UE-specific PDCCH. Each of $CORESET_X$ 102 and $CORESET_Y$ 104 may be applied by the gNB for scheduling a group-common PDSCH for data reception 106 (e.g., in $slot_{n+k}$). According to PTM transmission scheme I, the gNB may transmit DCI with CRC bits scrambled by a G-RNTI on a group-common PDCCH within $CORESET_X$ 102 for scheduling the group-common PDSCH for data reception 106 in $slot_{n+k}$. According to the PTM transmission scheme II, the gNB may transmit DCI with CRC bits scrambled by a C-RNTI on a UE-specific PDCCH within $CORESET_Y$ 104 for scheduling the group-common PDSCH for data reception 106 in $slot_{n+k}$.

In this present disclosure, a UE-specific PDCCH/PDSCH may mean that the UE-specific PDCCH/PDSCH can only be identified by the target UE but cannot be identified by other UEs in the same MBS group. Further, a group-common PDCCH/PDSCH may mean that the group-common PDCCH/PDSCH are transmitted on the same time/frequency resources and can be identified by all the UEs in the same MBS group. Here, the MBS group may refer to a group of multiple UEs intended to receive the same MBS service (e.g., data of the same MBS session). Alternatively, an MBS group may refer to one or more multicast/broadcast services having similar data arrival time/burst and being scheduled by the same CORESET.

In some implementations, $CORESET_X$ 102 configured for monitoring the group-common PDCCH and $CORESET_Y$ 104 configured for monitoring the UE-specific PDCCH may allocated in different bandwidth parts (BWPs) and/or serving cells. Given this, a BWP switch may occur when the transmission scheme is switched. Some cell activation/deactivation behaviors may also occur upon the switch of the transmission scheme.

In some implementations, once the PTM transmission scheme II is applied, a single (group-common) PDSCH may include data for two RLC bearers at the same time. Given this, a transport block received on the PDSCH may contain the MAC SDU(s) for the LCH of the RLC bearer for PTM and may also contain the MAC SDU(s) for the LCH of the other RLC bearer for PTP. The MAC SDU(s) for the LCH of the RLC bearer for PTM (or MAC SDU(s) for PTM) and the MAC SDU(s) for the LCH of the RLC bearer for PTP (or MAC SDU(s) for PTP) may be differentiated by the MAC entity via an LCID field of a MAC subheader of the MAC SDU. The gNB may multiplex the MAC SDU for PTM and the MAC SDU for PTP into a single MAC PDU. Such a MAC PDU may be scheduled by a UE-specific RNTI (e.g., C-RNTI).

Configuration of Protocol Stack for MBS Data Reception

A UE may be configured by a gNB with one or multiple of RLC bearers via downlink RRC signaling for supporting MBS services. An RLC bearer may correspond to an RLC entity and an associated logical channel (LCH). Each RLC bearer may be configured by the gNB to be associated with a PDCP entity or a radio bearer. The radio bearer may be a Multicast Radio Bearer (MRB) associated with an MBS session (or TMGI (Temporary Mobile Group Identity)) and/or associated with an MBS service. According to 3GPP Technical Specification (TS) 38.321, a logical channel is offered by a Media Access Control (MAC) entity to an RLC entity. The LCH may refer to a service access point between the MAC entity and the RLC entity.

In the PTM or PTP transmission scheme, the UE may be configured with at least two RLC bearers (corresponding to separated RLC entities).

Figure 2:
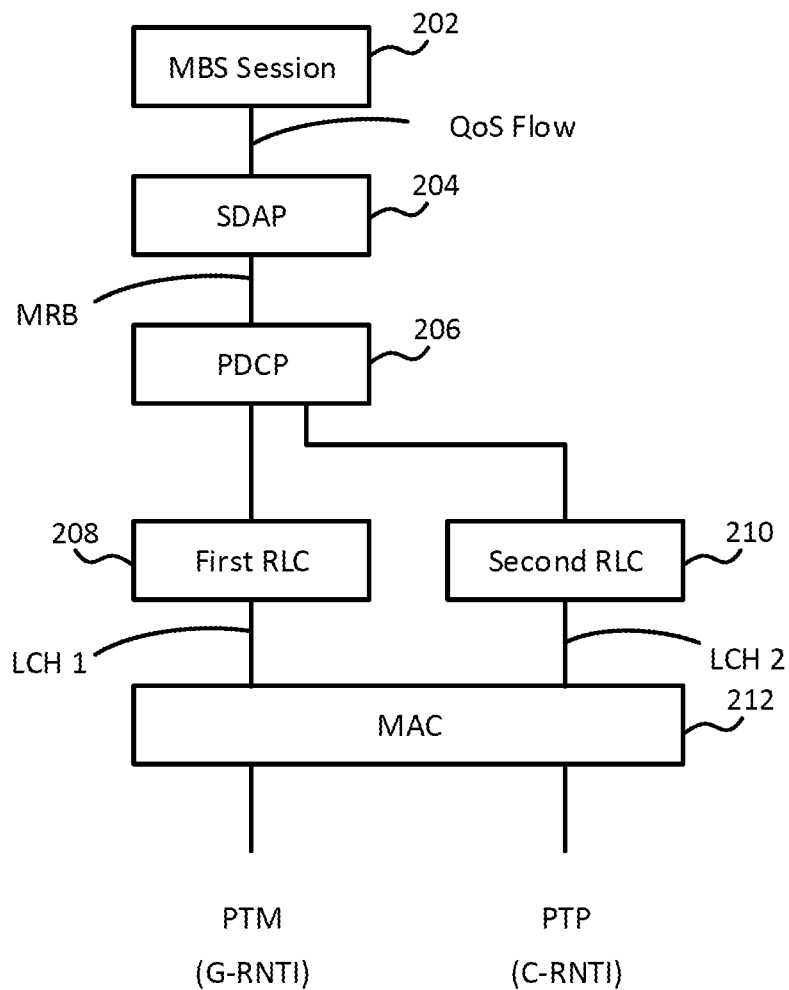
FIG. 2 is a diagram that illustrates an example of a protocol stack of a UE for IVIES data reception, according to an implementation of the present disclosure.

FIG. 2 is a diagram that illustrates an example of a protocol stack of a UE for MBS data reception, according to an implementation of the present disclosure. As shown in FIG. 2, the UE is configured with two RLC bearers/entities (e.g., a first RLC bearer 208 and a second RLC bearer 210), where the first RLC bearer 208 may be configured for handling PTM reception and the second RLC bearer 210 may be configured for handling PTP reception. The first RLC bearer 208 and the second RLC bearer 210 are associated with a common/single PDCP entity (e.g., PDCP entity 206) and a common/single MAC entity (e.g., MAC entity 212). Although in FIG. 2 the first RLC bearer 208 and the second RLC bearer 210 are associated with the same MAC entity 212, in some other implementations, the first RLC bearer 208 and the second RLC bearer 210 may be associated with different MAC entities (e.g., an MCG MAC and an SCG MAC).

The PDCP entity 206 may be associated with an MRB from the SDAP entity 204, which corresponds to an MBS session 202. An LCH 1 may belong to the first RLC bearer 208 and an LCH 2 may belong to the second RLC bearer 210.

The PTM transmission may be achieved (scheduled) by a gNB through a group (shared) RNTI (e.g., G-RNTI) and the PTP transmission may be achieved (scheduled) by the gNB through a UE-specific RNTI (e.g., C-RNTI). The group RNTI may be (pre)configured by the gNB and associated with an MRB (or an MBS session, or TMGI). In some implementations, a UE may be configured with multiple MRBs, where each MRB is associated with a group RNTI (e.g., a G-RNTI) configured by the gNB. For example, two MRBs may share the same group RNTI. In another example, two MRBs may associate with different group RNTIs. The group RNTI may be shared/applied by one or multiple UEs that are configured with the same MBS. For simplicity, in the present disclosure, the phrase "associated with one MRB" may be interpreted as "associated with one MBS," "associated with one MBS service," "associated with one MBS application," or "associated with one MBS session." In addition, the phrase "monitor PDCCH for DCI with CRC bits scrambled by the G-RNTI/C-RNTI" may be interpreted as "monitor G-RNTI/C-RNTI on the PDCCH" in the present disclosure.

Two-Stage MBS Data Delivery

Two types of logical channels (e.g., MCCH and MTCH) for MBS are introduced in NR. A two-stage data delivery mode that is compatible with these two types of logical channels is also introduced, as illustrated in FIG. 3.

Figure 3:
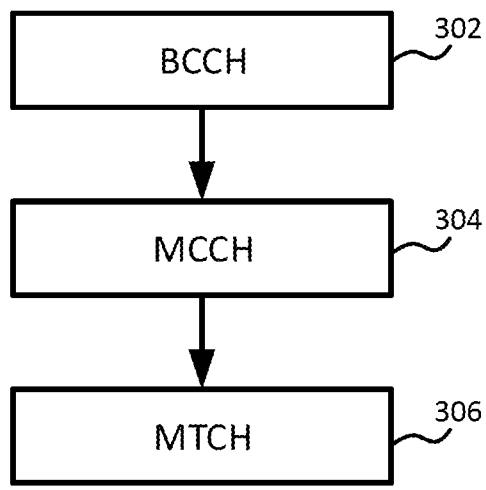
FIG. 3 is a diagram that illustrates an example of channel mapping of a two-stage data delivery mode, according to an implementation of the present application.

FIG. 3 is a diagram that illustrates an example of channel mapping of a two-stage data delivery mode, according to an implementation of the present application. According to FIG. 3, the UE may firstly read an MBS-specific configuration on a BCCH 302, and then monitor an MCCH 304 based on the MBS-specific configuration. The MBS data may be received on an MTCH 306 that is indicated by proper indication on the MCCH 304. The two-stage (MBS) data delivery mode may be applicable to UEs regardless of their current RRC state (e.g., the RRC_CONNECTED state, the RRC_IDLE state or the RRC_INACTIVE state).

In some implementations, the UE may be provided with an MCCH configuration using common (e.g., shared) RRC signaling via system information (e.g., MBS-SIB) transmitted on the BCCH 302 by the gNB. With the MCCH configuration, the UE is notified where to receive an MTCH configuration transmitted on the MCCH 304. The MTCH configuration may indicate to the UE how to receive the MBS data transmitted on the MTCH 306.

Figure 4:
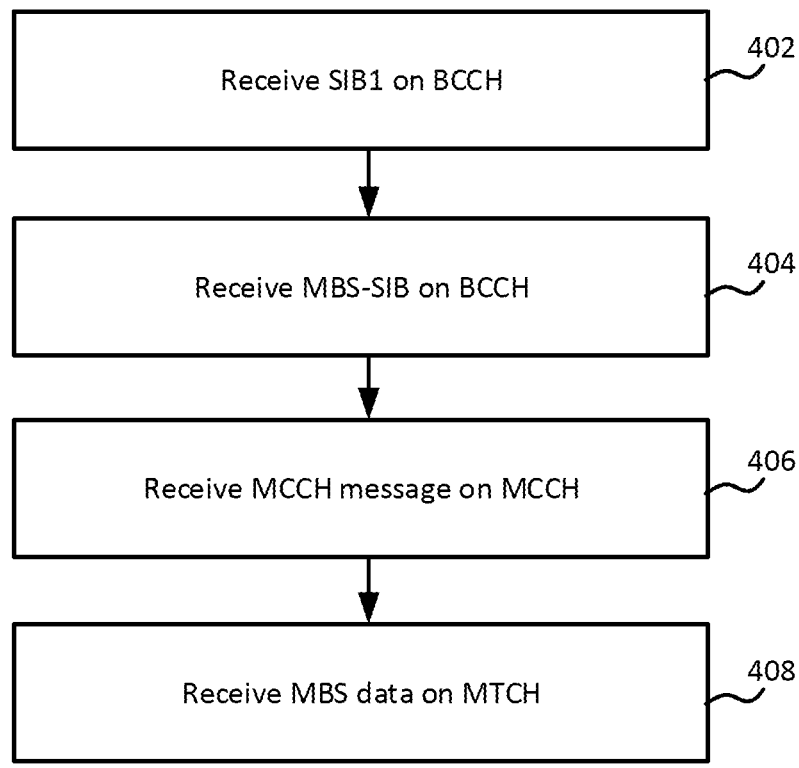
FIG. 4 is a flowchart illustrating a method for two-stage data delivery, according to an implementation of the present disclosure.

FIG. 4 is a flowchart illustrating a method for two-stage data delivery, according to an implementation of the present disclosure. While a UE generates its interest on a particular MBS service(s), the UE's RRC layer may trigger a SIB1 acquisition procedure to receive the SIB1 broadcasted by the gNB (action 402). In some implementations, the UE's RRC layer may not trigger the SIB1 acquisition procedure to receive the SIB1 broadcasted by the gNB if the UE has already stored a valid version of SIB1. The SIB1 may contain a particular configuration (or scheduling information) which may assist the UE in acquiring an MBS-SIB or any other SIB(s) from the gNB that carry MBS-related configuration needed by the UE. For example, the UE may receive the MBS-SIB that includes an MCCH configuration (action 404).

In the present disclosure, the MBS-SIB may refer to a SIB containing MBS-related information and/or information from which MBS-related information can be derived. In some implementations, the MBS-SIB may refer to a SIB derived from SIB1. In some implementations, the MBS-SIB may refer to SIB1. In some implementations, the MBS-SIB may refer to system information including SIB1 and/or other SIB(s) designed for MBS acquisition.

The MCCH configuration may include a particular MCCH-corresponding PDCCH configuration that indicates to the UE to perform PDCCH monitoring for receiving the MCCH message on the MCCH. That is, the MCCH configuration acquired from system information (e.g., MBS-SIB) may be applied by the UE for MCCH reception. The MCCH-corresponding PDCCH configuration may include an MCCH-specific CORESET configuration (e.g., ControlResourceSet IE) and an MCCH-specific search space configuration (e.g., SearchSpace IE). In the present disclosure, an MCCH-specific CORESET may be referred to as an MCCH-CORESET, and an MCCH-specific search space may be referred to as an MCCH search space. Each of the MCCH-CORESET and the MCCH search space may be associated with a respective identity. For example, the MCCH-CORESET may be associated with a CORESET ID and the MCCH search space may be associated with a search space ID. According to the MCCH-corresponding PDCCH configuration, the UE may perform PDCCH monitoring to a receive DL assignment for potential MCCH message reception on the MCCH (action 406).

The MCCH configuration may include a particular type of RNTI (e.g., an MCH-RNTI) that is applied by the gNB for a DL assignment for the MCCH. In this case, the MCCH message reception on the MCCH may be indicated by DCI with CRC bits scrambled by the MCH-RNTI. The MCCH configuration may include a cell specific or a UE-specific PDSCH configuration (e.g., PDSCH-config IE). The PDSCH configuration may include an MCCH-specific Time Domain Resource Allocation (TDRA) list (as defined in 3GPP TS 38.331, pdsch-TimeDomainAllocationList IE) that includes a list of K0 and/or K2 value(s) (as defined in 3GPP TS 38.214). The K0 and/or K2 value for the DL assignment for the MCCH message may refer to the MCCH-specific TDRA list. In some implementations, the MCCH-specific TDRA may be different from the TDRA list that is configured by the gNB for the data on a DTCH.

In some implementations, the PDSCH configuration may include a repetition configuration. The repetition configuration indicates the number of times the gNB repeats the transmission for the MCCH on the PDSCH.

In some implementations, the MCCH configuration may include an MBS DRX configuration that may be used for controlling the monitoring of an MCCH-CORESET/MCCH-search space. The MBS DRX configuration may include at least one of the following: a DRX inactivity timer (e.g., drx-InactivityTimer), an ON-duration timer (e.g., onDurationTimer), a DRX short cycle (e.g., drx-ShortCycle), a DRX short cycle timer (e.g., drx-ShortCycleTimer), a DRX slot offset (e.g., drx-SlotOffset), and a DRX long cycle start offset (e.g., drx-LongCycleStartOffset). In some implementations, if one or more parameters of an MBS DRX configuration are not present, the UE may apply the value of the one or more parameters of a normal MBS DRX configuration.

In some implementations, the MCCH message may be scheduled by DCI that associates with a specific HARQ process. As such, the UE may perform soft combining of the received MCCH message (within the same MCCH modification period). Here, the MCCH modification period may also be included in the MCCH configuration.

Tuning to FIG. 4, the MCCH message may include an MTCH configuration, and the MTCH configuration may include at least a particular MTCH-corresponding PDCCH configuration that indicates to the UE to perform PDCCH monitoring for receiving the MBS data transmitted on the MTCH (action 408). That is, the MTCH configuration acquired from the MCCH may be applied by the UE for performing MTCH reception. The MTCH-corresponding PDCCH configuration may include an MTCH-specific CORESET configuration and an MTCH-specific search space configuration. In the present disclosure, the MTCH-specific CORESET and the MTCH-specific search space may be referred to as MTCH-CORESET and MTCH-searchspace, respectively. Each of the MTCH-CORESET and the MTCH-searchspace may be associated with a respective identity. For example, the MTCH-CORESET may be associated with a CORESET ID and the MTCH-searchspace may be associated with a search space ID.

In some implementations, the MTCH configuration may contain a cell-specific/UE-specific PDSCH configuration (e.g., PDSCH-config IE). The PDSCH configuration may include an MTCH-specific TDRA list that includes a list of K0 and/or K2 value(s). The K0 and/or K2 value for the DL assignment for the MBS data on the MTCH may refer to the MTCH-specific TDRA list. The MTCH-specific TDRA list may be different from the TDRA list configured by the gNB for the data on a DTCH and/or on an MCCH.

In some implementations, the PDSCH configuration may include a repetition configuration. The repetition configuration may indicate a number of times the gNB may repeat its transmission for MTCH on the PDSCH.

In some implementations, the MTCH configuration may include an MBS DRX configuration, and the MBS DRX configuration may be used for controlling the monitoring of an MTCH-CORESET/MTCH-searchspace. The MBS DRX configuration may include at least one of drx-InactivityTimer, onDurationTimer, drx-ShortCycle, drx-ShortCycleTimer, drx-SlotOffset, and drx-LongCycleStartOffset. In some implementations, if one or more parameters of an MBS DRX configuration are not present, the UE may apply the value of the one or more parameters of a normal MBS DRX configuration.

One-Stage MBS Data Delivery

To reduce the loading of a PBCH and reduce the latency on acquiring an MCCH/MTCH configuration, a UE, when operated in the RRC_CONNECTED state, may receive the MCCH configuration from the gNB through dedicated DL RRC signaling without reading system information such as MBS-SIB. After receiving the MCCH configuration, the UE may perform certain procedures described herein to acquire an MTCH according to the received MCCH configuration. In some implementations, the MCCH configuration may be provided by the gNB via dedicated DL RRC signaling, e.g., an RRC release message (RRCRelease message), an RRC reconfiguration message (RRCReconfiguration message), or a new RRC message designed for MBS. The RRCRelease message may be used to instruct a UE to release the RRC connection and move to an RRC_INACTIVE state or an RRC_IDLE state. Therefore, the UE may acquire the MTCH according to the MCCH configuration in the RRC_INACTIVE state or the RRC_IDLE state. In some implementations, a UE may override an MCCH configuration that is received via a broadcast message (e.g., MBS-SIB) by another MCCH configuration that is received via dedicated DL RRC signaling (assuming that the dedicated DL RRC signaling is received after the broadcast message). In some implementations, a UE may not override an MCCH configuration received via dedicated DL RRC signaling by another MCCH configuration that is received via a broadcast message (assuming the broadcast message is received after the dedicated DL RRC signaling). In some implementations, an MCCH configuration received by a UE via dedicated DL RRC signaling may be released or suspended if the UE moves out of an area (e.g., the UE leaves the cell from which the MCCH configuration is received, leaving a RAN notification area indicated in an RRCRelease message, or leaving a configured/pre-defined area). In some implementations, an MCCH configuration received by a UE via dedicated DL RRC signaling may be released or suspended when a timer expires. For example, the timer may be associated with an MCCH configuration, and the timer may start when the UE receives the MCCH configuration. The timer may be (re)started when a new MCCH configuration is received. The MCCH configuration may be released or suspended when the timer expires.

In some implementations, to reduce the loading of an MCCH and reduce the latency on acquiring an MTCH configuration, a UE, when entering the RRC_CONNECTED state, may receive an MTCH configuration from the gNB via dedicated DL RRC signaling without acquiring a corresponding MCCH configuration via the MBS-SIB. In other words, the UE may not need to acquire the MCCH configuration via the MBS-SIB while operated in the RRC_CONNECTED state, at least in the same MCCH modification period, if the MTCH configuration is received via dedicated DL RRC signaling. Hence, after receiving the MTCH configuration, the UE may follow certain procedures described herein to acquire MBS data by the MTCH configuration. In some implementations, the MTCH configuration may be provided by the gNB via an RRCRelease message, an RRCReconfiguration message, or a new RRC message designed for MBS. The RRCRelease message may be used to instruct the UE to release the RRC connection and move to either the RRC_INACTIVE state or the RRC_IDLE state. That is, the UE may acquire MBS data according to the MTCH configuration when operated in the RRC_INACTIVE state or the RRC IDLE state.

In some implementations, a UE may override an MTCH configuration received via a broadcast message (e.g., MBS-SIB) by another MTCH configuration that is received via dedicated DL RRC signaling (assuming that the dedicated DL RRC signaling is received after the broadcast message). The UE may not override an MTCH configuration received via dedicated DL RRC signaling by an MTCH configuration that is received via a broadcast message (assuming the broadcast message is received after the dedicated DL RRC signaling). In some implementations, an MTCH configuration received by a UE via dedicated DL RRC signaling may be released or suspended if the UE moves out of an area (e.g., leaving the cell from which the MCCH configuration is received, leaving a RAN notification area indicated in an RRCRelease message, or leaving a configured/pre-defined area). In some implementations, an MTCH configuration received by a UE via dedicated DL RRC signaling may be released or suspended if a timer expires. For example, the timer may be associated with an MTCH configuration, and the timer may start when the UE receives the MTCH configuration. The timer may be (re)started when a new MTCH configuration is received. The MTCH configuration may be released or suspended when the timer expires.

In some implementations, the MTCH configuration may not explicitly notify a UE of a particular MTCH-specific PDCCH configuration. According to a pre-defined rule, a UE may perform PDCCH monitoring by reusing the MCCH-specific PDCCH configuration provided by the gNB via the dedicated RRC signaling (e.g., RRCRelease, RRCReconfiguration, or a new RRC message designed for MBS).

MCCH CORESET Sharing MTCH

To reduce potential complexity on PDCCH monitoring, the gNB may transmit a DL assignment for MBS data on a CORESET configured for an MCCH. That is, the DL assignment for the MTCH and the MCCH may be performed (or transmitted) on the same CORESET. In some implementations, the MTCH configuration may not explicitly notify the UE of the particular MTCH-corresponding PDCCH configuration. Per some pre-defined rules, the UE may perform PDCCH monitoring for an MTCH by reusing an MCCH-corresponding PDCCH configuration provided by the gNB (e.g., via an MBS-SIB).

In some implementations, the UE may be configured with an MCCH-CORESET and an MCCH-searchspace. The MTCH-corresponding PDCCH configuration contained in the MTCH configuration may indicate a CORESET ID and a search space ID, where the CORESET ID is associated with the MCCH-CORESET and the search space ID is associated with the MCCH-searchspace. The UE may apply the MCCH-CORESET and the MCCH-searchspace for PDCCH monitoring for MTCH reception.

In some implementations, the MTCH-corresponding PDCCH configuration contained in the MTCH configuration may indicate to the UE only an MTCH-specific CORESET configuration or an MTCH-specific search space configuration. Per some pre-defined rules, the UE may perform PDCCH monitoring by reusing the MCCH-specific CORESET configuration or the MCCH-specific search space configuration provided by the gNB in the MCCH-corresponding PDCCH configuration (via the MBS-SIB). For example, with the MTCH-corresponding PDCCH configuration, UE is configured with an MTCH-CORESET and indicated with a search space ID associated with the MCCH-searchspace. Hence, the UE performs PDCCH monitoring by applying the MTCH-CORESET and the MCCH-searchspace associated with the search space ID. In another example, with the MTCH-corresponding PDCCH configuration, the UE is configured with an MTCH-searchspace and indicated with a CORESET ID which is associated with the MCCH-CORESET. The UE may perform PDCCH monitoring by applying the MCCH-CORESET associated with the CORESET ID and the MTCH-searchspace.

In some implementations, to prevent configuring a UE with too many CORESETs, thus causing the UE to perform a large amount of PDCCH monitoring and resulting in increased complexity of the UE's implementation and increased power consumption, the gNB may not need to provide a UE with both the MCCH-CORESET and the MTCH-CORESET. In some implementations, if the MCCH-CORESET is not provided by the gNB, the UE may still need to perform PDCCH monitoring for MCCH, but the PDCCH monitoring may be performed on a CORESET that is configured for PDCCH monitoring for receiving a SIB1 and/or an MBS-SIB. In some implementations, if the MTCH-CORESET is not provided by the gNB, the UE may still need to perform PDCCH monitoring for MTCH, but the PDCCH monitoring may be performed on a CORESET that is configured for PDCCH monitoring for receiving at least one of an MCCH (e.g., MCCH-CORESET), an MBS-SIB, and a SIB1.

MCCH Associated with Multiple MTCHs

Since a UE may be simultaneously interested in multiple MBS sessions/services that are provided on different MTCHs, an MCCH message may include multiple MTCH configurations to reduce signaling overhead and to reduce the complexity of PDCCH monitoring. In some implementations, each MTCH configuration may be associated with a respective MBS session and/or quality of service (QoS) flow. The UE may receive multiple sets of MTCH-corresponding PDCCH configurations from the MTCH configurations. Each MTCH-corresponding PDCCH configuration may indicate to the UE to perform PDCCH monitoring for receiving the DL assignment for MBS data transmitted on the corresponding MTCH. That is, the UE may perform PDCCH monitoring for multiple MTCHs simultaneously according to the one or more MTCH configurations.

Association Among Beam/SSB, MCCH, and MTCH

An advanced feature that NR had introduced is multi-beam operation in a radio access network (RAN). To implement the multi-beam operation, the gNB may provide, via RRC signaling to the UE, a measurement configuration that includes configurations of Synchronization Signal and PBCH block (SSB)/CSI-RS resources and resource sets, reports, and trigger states for triggering channel and interference measurements and reports. According to the configured measurement and/or reporting behavior, the DL transmission and UL transmission may be performed via a particular beam. As defined in 3GPP TS 38.331, an SSB includes a primary synchronization signal (PSS), a secondary synchronization signals (SSS), and PBCH spanning. Each beam may be used to transmit a respective SSB. For example, for a serving cell hosted by a gNB having two DL beams (e.g., beam 1 and beam 2), the gNB may transmit a first SSB via beam 1 and transmit a second SSB via beam 2. In the present disclosure, the SSB transmitted via beam 1 may be referred to as SSB1 and the SSB transmitted via beam 2 may be referred to as SSB2.

With the multi-beam operation, the MCCH transmission and the MTCH transmission may be performed flexibly. For example, the DL transmission on an MCCH CORESET, an MCCH, an MTCH CORESET and/or an MTCH may be performed on a particular beam associated with a particular SSB.

Figure 5:
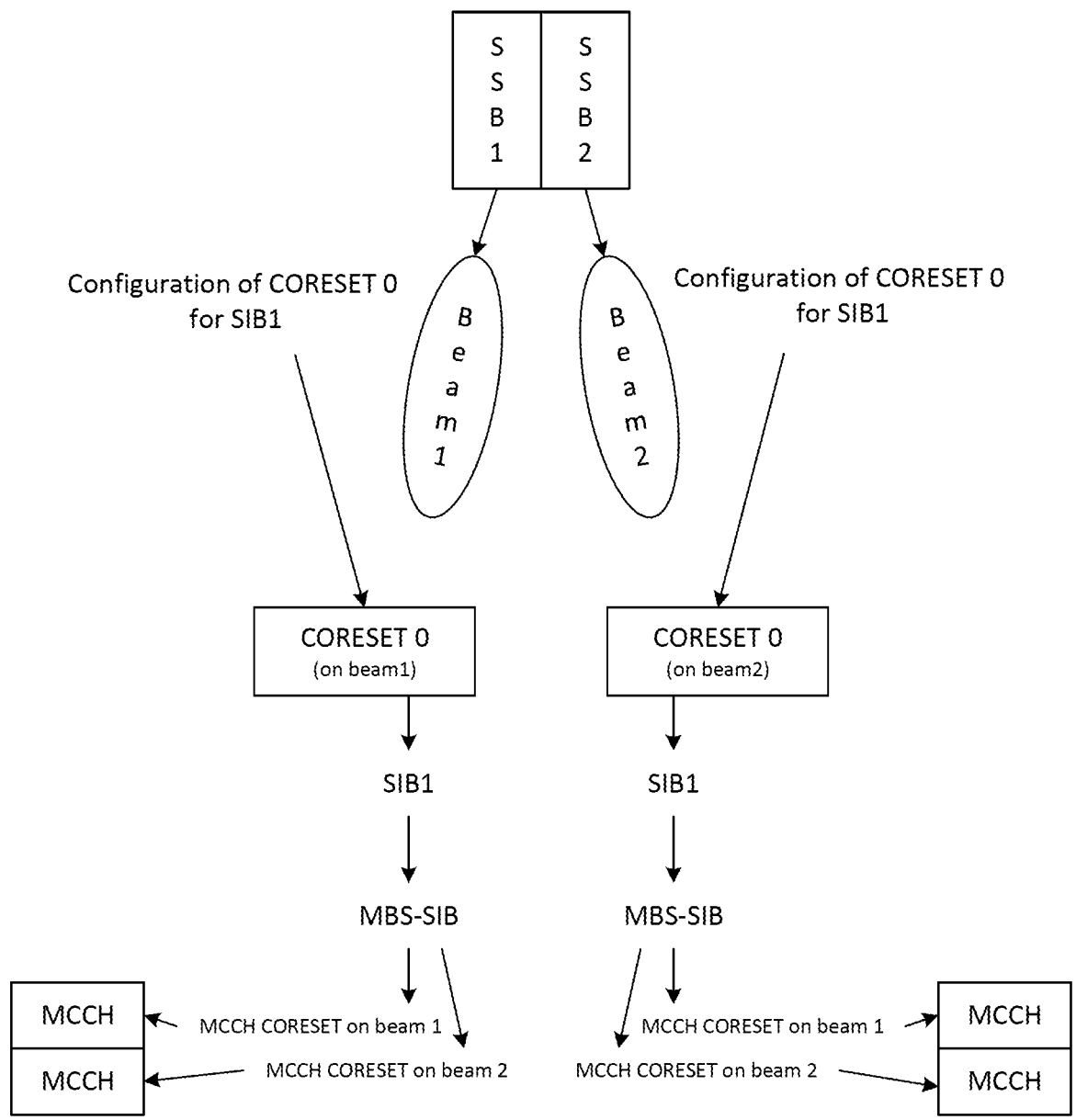
FIG. 5 is a diagram that illustrates the association relationship among multiple beams, SSBs, and logical channels under a multi-beam operation, according to an implementation of the present disclosure.

FIG. 5 is a diagram that illustrates the association relationship among multiple beams, SSBs, and logical channels under a multi-beam operation, according to an implementation of the present disclosure.

As illustrated in FIG. 5, within a serving cell of a gNB, the gNB may transmit at least two DL beams (e.g., beam 1 and beam 2), each associated with a respective SSB (e.g., beam 1 is associated with SSB1 and beam 2 is associated with SSB2). The gNB may broadcast the SIB1 via beam 1 and beam 2 on PBCH. The SIB1 transmitted through beam 1 may be scheduled by the gNB via CORESET 0 transmitted by beam 1. The SIB1 transmitted through beam 2 may be scheduled by the gNB via CORESET 0 transmitted by beam 2. The SIB1 transmitted through beam 1 and the SIB1 transmitted through beam 2 may individually indicate to a UE where to receive the MBS-SIB. That is, the gNB may transmit an MBS-SIB through beam 1 and transmit another MBS-SIB through beam 2. Through the received MBS-SIB (s), the UE may perform PDCCH monitoring to receive MCCH CORESET(s) on different beams (e.g., beam 1 and beam 2) and then receive MCCHs scheduled by the MCCH CORESET(s).

Figure 6A:
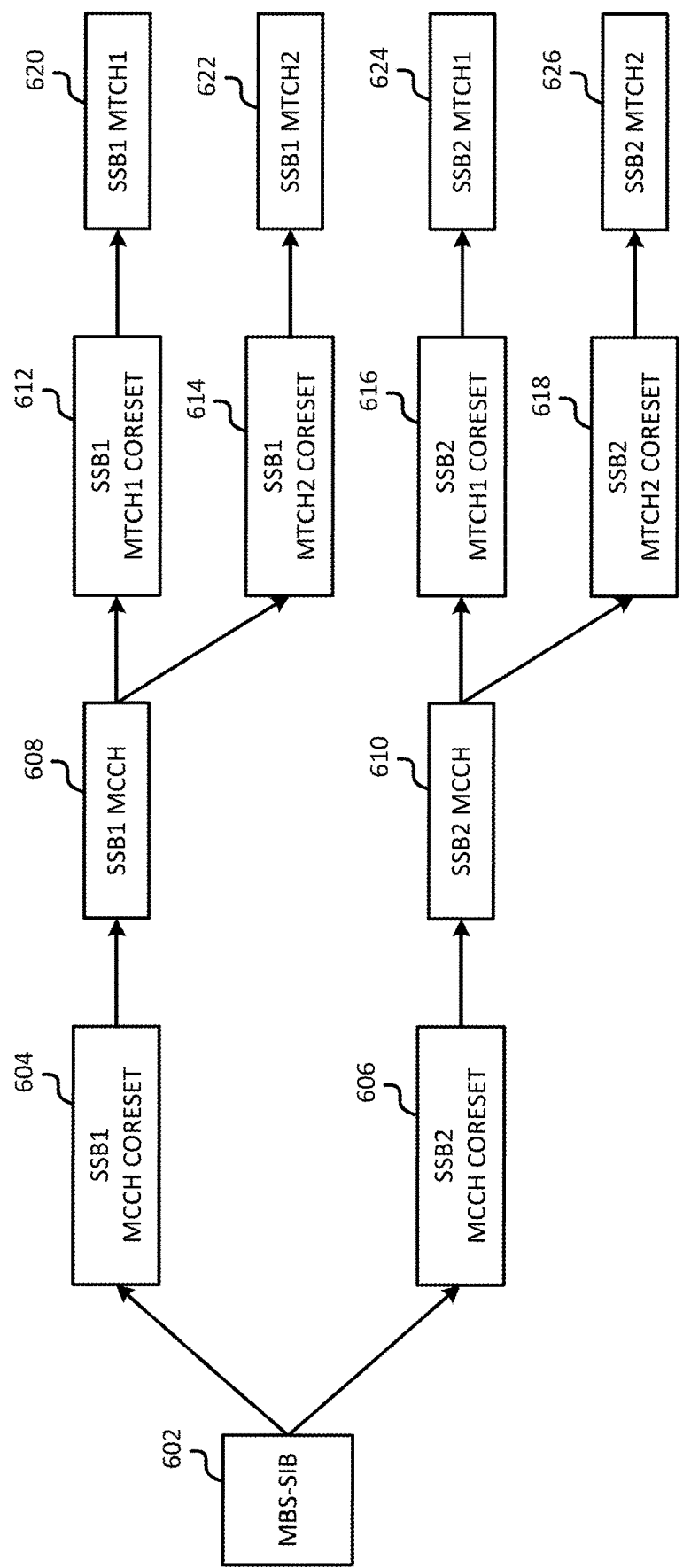
FIG. 6A is a diagram that illustrates an association relationship between MCCHs and MTCHs in a case of multi-beam operation, according to an implementation of the present disclosure.

FIG. 6A is a diagram that illustrates an association relationship between MCCHs and MTCHs in a case of multi-beam operation, according to an implementation of the present disclosure.

The notations used in FIG. 6A follow the following definitions, where n and m represent indices (e.g., numbering):

SSBn MCCH CORESET: an MCCH CORESET applied by the gNB for transmitting a DL assignment via a particular beam (e.g., beamn) associated with the SSBn.

SSBn MCCH: an MCCH applied by the gNB for transmitting an MCCH message via a beam (e.g., beamn) associated with the SSBn.

SSBn MTCHm CORESET: an MTCH CORESET applied by the gNB for transmitting the DL assignment via a particular beam (e.g., beamn) associated with the SSBn, where the MTCH CORESET is configured by the gNB for a particular MBS session/service (e.g., MBS session m).

SSBn MTCHm: an MTCH applied by the gNB for transmitting MBS data via a particular beam (e.g., beamn) associated with the SSBn, where the MTCH is configured by the gNB for a particular MBS session/service (e.g., MBS session m).

In some implementations, a gNB may provide one or more beam-specific MCCH configurations in the MBS-SIB 602. For example, within a cell, if a gNB is capable of transmitting at least two DL beams (e.g., beam1 and beam2), each DL beam may be associated with a respective SSB (e.g., beam 1 is associated with SSB1 and beam 2 is associated with SSB2). The MBS-SIB transmitted by the gNB (e.g., through beam 1 or beam 2) may include two MCCH configurations (e.g., MCCH configuration 1 and MCCH configuration 2), where each MCCH configuration is associated with a respective SSB (e.g., MCCH configuration 1 is associated with SSB1 and MCCH configuration 2 is associated with SSB2). Each MCCH configuration may contain an SSB index associated with an SSB within an SS-Burst. An MCCH configuration associated with an SSB may be implemented by including an SSB index of the SSB in the MCCH configuration. The MCCH configuration 1 may be used to configure the UE with the SSB1 MCCH CORESET 604 and the MCCH configuration 2 may be used to configure the UE with the SSB2 MCCH CORESET 606. The SSB1 MCCH CORESET 604 and the SSB2 MCCH CORESET 606 are used to schedule the DL reception on the SSB1 MCCH 608 and the SSB2 MCCH 610, respectively. In some implementations, a mapping table that identifies the one-to-one mapping relationship between the MCCH- CORESET/MCCH-searchspace and its associated SSB may be included in the MBS-SIB 602.

In some implementations, the gNB may provide one or more beam-specific MTCH configurations in the MCCH message. For example, within a cell, if the gNB is capable of transmitting at least two DL beams (e.g., beam1 and beam2), each DL beam may be associated with a respective SSB (e.g., beam 1 is associated with SSB1 and beam 2 is associated with SSB2). If the gNB provides two MBS sessions (e.g., MBS session 1 and MBS session 2), the MCCH message transmitted by the gNB on the SSB1 MCCH 608 may include two MTCH configurations (e.g., MTCH configuration 1 and MTCH configuration 2), where each of the MTCH configurations is associated with a respective MBS session (e.g., MTCH configuration 1 is associated with MBS session 1 and MTCH configuration 2 is associated with MBS session 2). The MTCH configuration 1 may configure the UE with the SSB1 MTCH1 CORESET 612. The MTCH configuration 2 may configure the UE with the SSB1 MTCH2 CORESET 614, where the SSB1 MTCH1 CORESET 612 and the SSB1 MTCH2 CORESET 614 are used for scheduling MBS data on the SSB1 MTCH1 620 and the SSB1 MTCH2 622, respectively. Another MCCH message transmitted by the gNB on the SSB2 MCCH 610 may include two MTCH configurations (e.g., MTCH configuration 3 and MTCH configuration 4, where MTCH configuration 3 is associated with MBS session 1 and MTCH configuration 4 is associated with MBS session 2). The MTCH configuration 3 may configure the UE with the SSB2 MTCH1 CORESET 616. The MTCH configuration 4 may configure the UE with the SSB2 MTCH2 CORESET 618, where the SSB2 MTCH1 CORESET 616 and the SSB2 MTCH2 CORESET 618 are used for scheduling MBS data on the SSB2 MTCH1 624 and the SSB2 MTCH2 626, respectively.

In some implementations, an MTCH CORESET configured by the gNB may not be explicitly indicated by (or associated with) a specific SSB. An implicit way to associate an MTCH CORESET with a specific SSB may be used. For example, if an MTCH CORESET configured by the gNB via a particular configuration (e.g., MCCH message) is determined from a particular MCCH (e.g., SSB1 MCCH), the UE may determine both the MTCH scheduled by the MTCH CORESET and the MTCH CORESET itself to be transmitted by the gNB through a beam (or SSB), where this beam (or SSB) is the same as the beam (or SSB) that is applied by the gNB to perform the transmission on the MCCH.

Figure 6B:
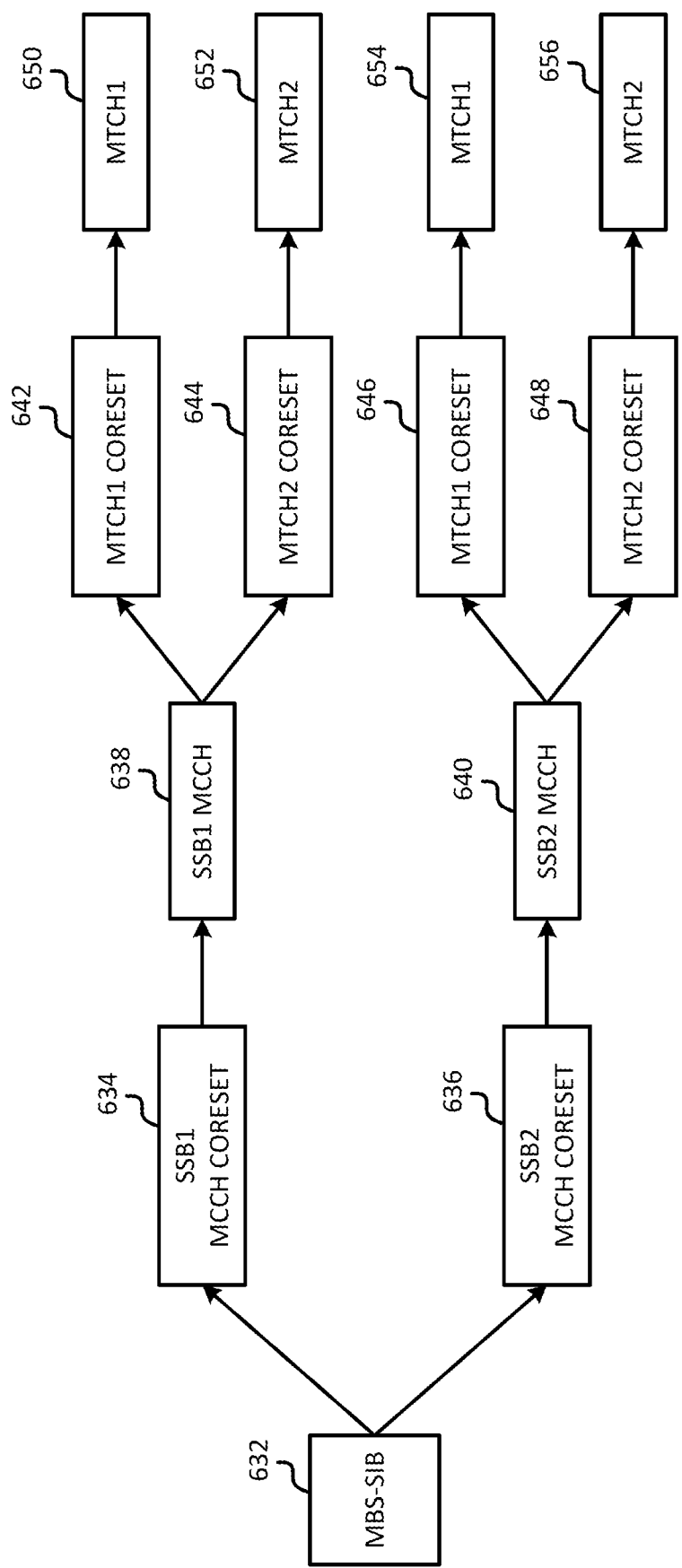
FIG. 6B is a diagram that illustrates an association relationship between MCCHs and MTCHs in a case of multi-beam operation, according to an implementation of the present disclosure.

FIG. 6B is a diagram that illustrates an association relationship between MCCHs and MTCHs in a case of multi-beam operation, according to an implementation of the present disclosure. The notations used in FIG. 6B follow the above definitions that are applied in FIG. 6A.

According to FIG. 6B, the following association relationships may be determined (implicitly) by the UE from beam 1 (e.g., SSB1):

MTCH1 CORESET 642 configured through the SSB1 MCCH 638;
MTCH2 CORESET 644 configured through the SSB1 MCCH 638;
MTCH1 650 scheduled by the MTCH1 CORESET 642 configured through the SSB1 MCCH 638; and
MTCH2 652 scheduled by the MTCH2 CORESET 644 configured through the SSB1 MCCH 638.

The following association relationships may be determined (implicitly) by the UE from beam 2 (e.g., SSB2):

MTCH1 CORESET 646 configured through the SSB2 MCCH 640;
MTCH2 CORESET 648 configured through the SSB2 MCCH 640;
MTCH1 654 scheduled by the MTCH1 CORESET 646 configured through the SSB2 MCCH 640; and
MTCH2 656 scheduled by the MTCH2 CORESET 648 configured through the SSB2 MCCH 640.

The SSB1 MCCH 638 may be scheduled by the SSB1 MCCH CORESET 634 that is derived from the MBS-SIB 632. The SSB2 MCCH 640 may be scheduled by the SSB2 MCCH CORESET 636 that is derived from the MBS-SIB 632.

In some implementations, from the MCCH message's perspective, the SSB1 MCCH may not only provide an MTCH configuration associated with SSB1 but also provide an MTCH configuration associated with other SSB(s) (e.g., SSB2). Given this, the UE may receive the MTCH configuration associated with SSB2 without monitoring the SSB2 MCCH, thereby reducing the signal (reading) overhead for communicating the MTCH-related information and reducing the latency of switching from SSB1 to SSB2 for receiving MBS data provide through beam 2.

Figure 7:
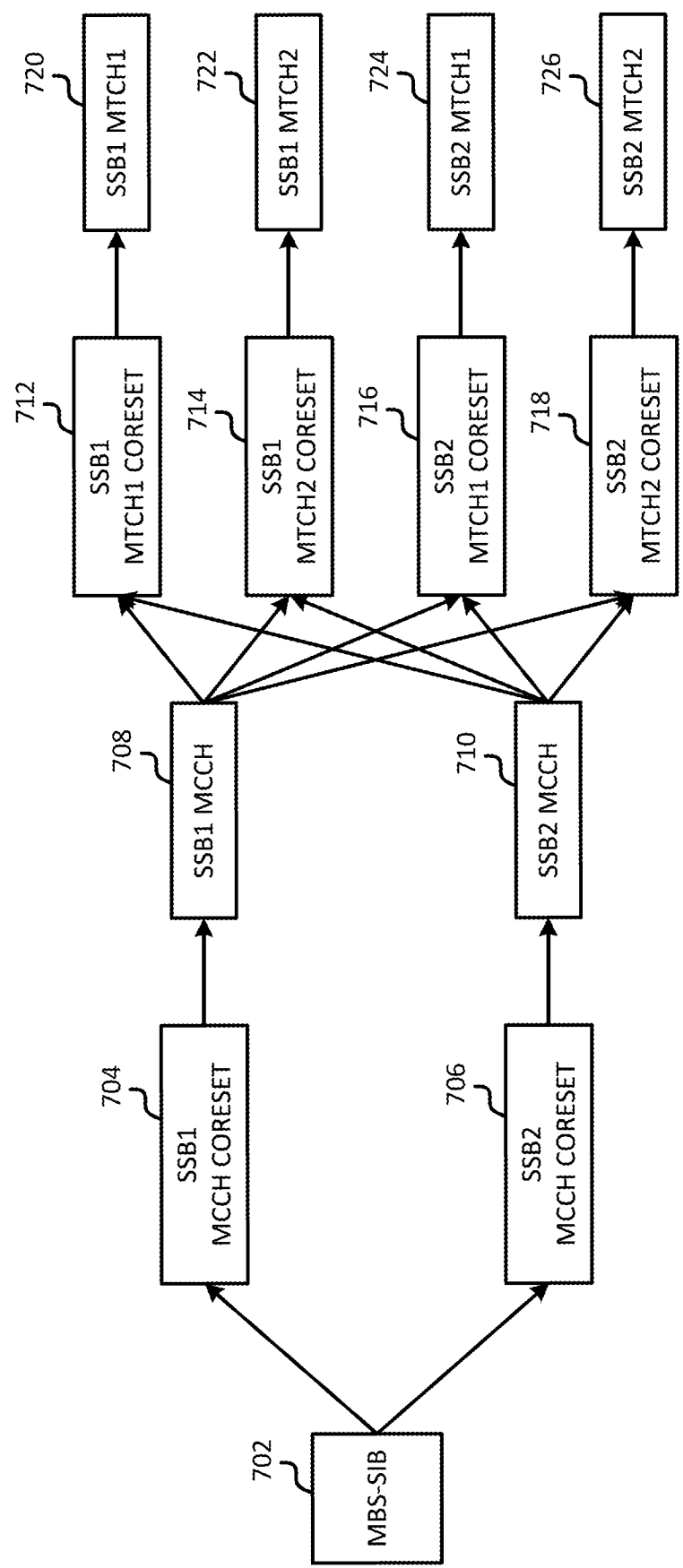
FIG. 7 is a diagram that illustrates an association relationship between MCCHs and MTCHs in a case of multi-beam operation, according to an implementation of the present disclosure.

FIG. 7 is a diagram that illustrates an association relationship between MCCHs and MTCHs in a case of multi-beam operation, according to an implementation of the present disclosure. The notations used in FIG. 7 follow the above definitions that are at least applied in FIG. 6A.

In FIG. 7, a gNB may provide one or more beam-specific MCCH configurations in the MBS-SIB 702. For example, within a cell, if the gNB is capable of transmitting at least two DL beams (e.g., beam1 and beam2), each DL beam may be associated with a respective SSB (e.g., beam 1 is associated with SSB1 and beam 2 is associated with SSB2). The MBS-SIB 702 transmitted by the gNB may include at least two MCCH configurations (e.g., MCCH configuration 1 and MCCH configuration 2), where each of the MTCH configurations is associated a respective SSB (e.g., MTCH configuration 1 is associated with SSB1 and MTCH configuration 2 is associated with SSB2). The MCCH configuration 1 may configure the UE with the SSB1 MCCH CORESET 704. The MCCH configuration 2 may configure the UE with the SSB2 MCCH CORESET 706, where the SSB1 MCCH CORESET 704 and the SSB2 MCCH CORESET 706 are applied for scheduling DL reception on the SSB1 MCCH 708 and the SSB2 MCCH 710, respectively.

The gNB may provide all beam-specific MTCH configurations in the MCCH message(s). For example, in a case that the gNB provides two MBS sessions (e.g., MBS session 1 and MBS session 2), each of the MCCH messages transmitted by the gNB on the SSB1 MCCH 708 and the SSB2 MCCH 710 may include four MTCH configurations (e.g., MTCH configuration 1, 2, 3, and 4). The MTCH configuration 1 may configure the UE with the SSB1 MTCH1 CORESET 712 that schedules the SSB1 MTCH1 720. The MTCH configuration 2 may configure the UE with the SSB1 MTCH2 CORESET 714 that schedules the SSB1 MTCH2 722. The MTCH configuration 3 may configure the UE with the SSB2 MTCH1 CORESET 716 that schedules the SSB2 MTCH1 724. The MTCH configuration 4 may configure the UE with the SSB2 MTCH2 CORESET 718 that schedules the SSB2 MTCH2 726.

As described above, if two MBS sessions (e.g., MBS session 1 and MBS session 2) are provided by the gNB, the MBS data transmissions corresponding to the MBS session 1 and MBS session 2 may be performed on two independent MTCHs (e.g., MTCH 1 and MTCH 2), respectively, where the MTCH configuration 1 and the MTCH configuration 2 may be carried by a single MCCH. To increase the scheduling flexibility for multiple sets of MTCH configurations (e.g., MTCH configuration 1 and MTCH configuration 2) on the gNB, the MTCH configuration 1 and MTCH configuration 2 may be carried by different MCCHs (e.g., SSB1 MCCH1 and SSB1 MCCH2) in some implementations, as illustrated in FIG. 8.

Figure 8:
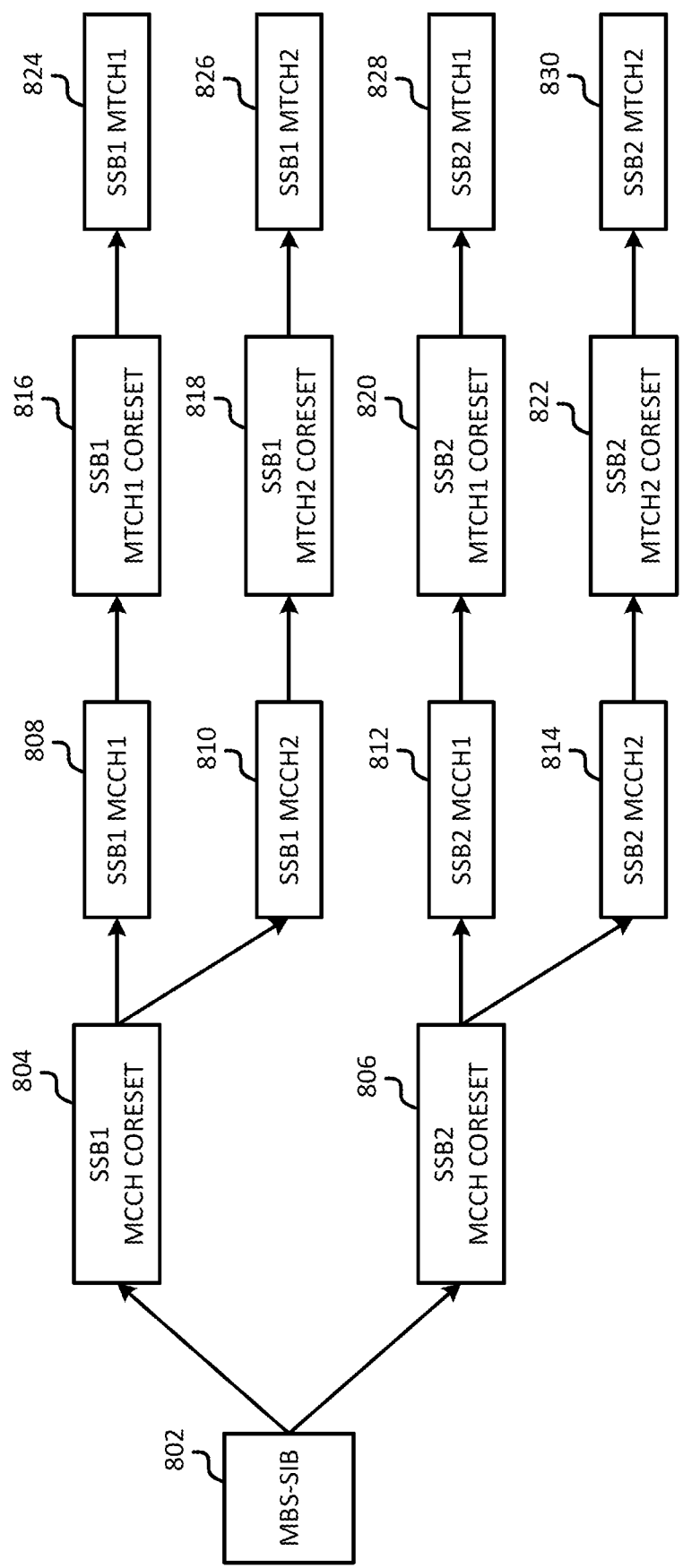
FIG. 8 is a diagram that illustrates an association relationship between MCCHs and MTCHs in a case of multi-beam operation, according to an implementation of the present disclosure.

FIG. 8 is a diagram that illustrates an association relationship between MCCHs and MTCHs in a case of multi-beam operation, according to an implementation of the present disclosure. The notations used in FIG. 8 follow the above definitions that are at least applied in FIG. 6A. In addition, the following definition is also applied:

SSBn MCCHm: an MCCH which may be applied by the gNB for transmitting an MCCH message via a beam (e.g., beamn) associated with the SSBn, wherein the MCCH is configured by the gNB for a particular MBS session/service (e.g., MBS session m). For example, SSB1 MCCH1 refers to an MCCH for transmitting an MCCH message via beam 1 associated with SSB1, where the MCCH is configured by the gNB for MBS session 1 (e.g., the UE can derive a resource location for receiving data of MBS session 1 from the MCCH).

According to FIG. 8, the MTCH configuration 1 configures the UE with the SSB1 MTCH1 CORESET 816, and the MTCH configuration 2 configures the UE with the SSB1 MTCH2 CORESET 818. The MTCH configuration 1 and the MTCH configuration 2 are transmitted on the SSB1 MCCH1 808 and the SSB1 MCCH2 810, respectively. Similarly, the gNB may transmit the MTCH configuration 3 to configure the UE with the SSB2 MTCH1 CORESET 820 and transmit the MTCH configuration 4 to configure the UE with the SSB2 MTCH2 CORESET 822, where the MTCH configuration 3 and the MTCH configuration 4 are transmitted on the SSB2 MCCH1 812 and the SSB2 MCCH2 814, respectively.

The SSB1 MTCH1 CORESET 816 schedules the SSB1 MTCH1 824. The SSB1 MTCH2 CORESET 818 schedules the SSB1 MTCH2 826. The SSB2 MTCH1 CORESET 820 schedules the SSB2 MTCH1 828. The SSB2 MTCH2 CORESET 822 schedules the SSB2 MTCH2 830.

In some implementations, the SSB1 MCCH1 824 and the SSB1 MCCH2 826 may be scheduled by the gNB via different types of RNTI. The SSB2 MCCH1 828 and the SSB2 MCCH2 830 may be scheduled by the gNB via different types of RNTI. In some implementations, the SSB1 MCCH1 824 and the SSB2 MCCH1 828 may be scheduled by the same type of RNTI. In some implementations, the SSB1 MCCH2 826 and the SSB2 MCCH2 830 may be scheduled by the same type of RNTI.

The MTCH configuration 1 and the MTCH configuration 2 may be scheduled by the same CORESET (e.g., the SSB1 MCCH CORESET 804). The MTCH configuration 3 and the MTCH configuration 4 may be scheduled by the same CORESET (e.g., the SSB2 MCCH CORESET 806). The UE may derive the SSB1 MCCH CORESET 804 and/or the SSB2 MCCH CORESET 806 from the MBS-SIB 802.

In some implementations, the MTCH configuration 1 and MTCH configuration 2 may be carried by different MCCH messages, and the MTCH configuration 3 and MTCH configuration 4 may be carried by different MCCH messages.

Figure 9:
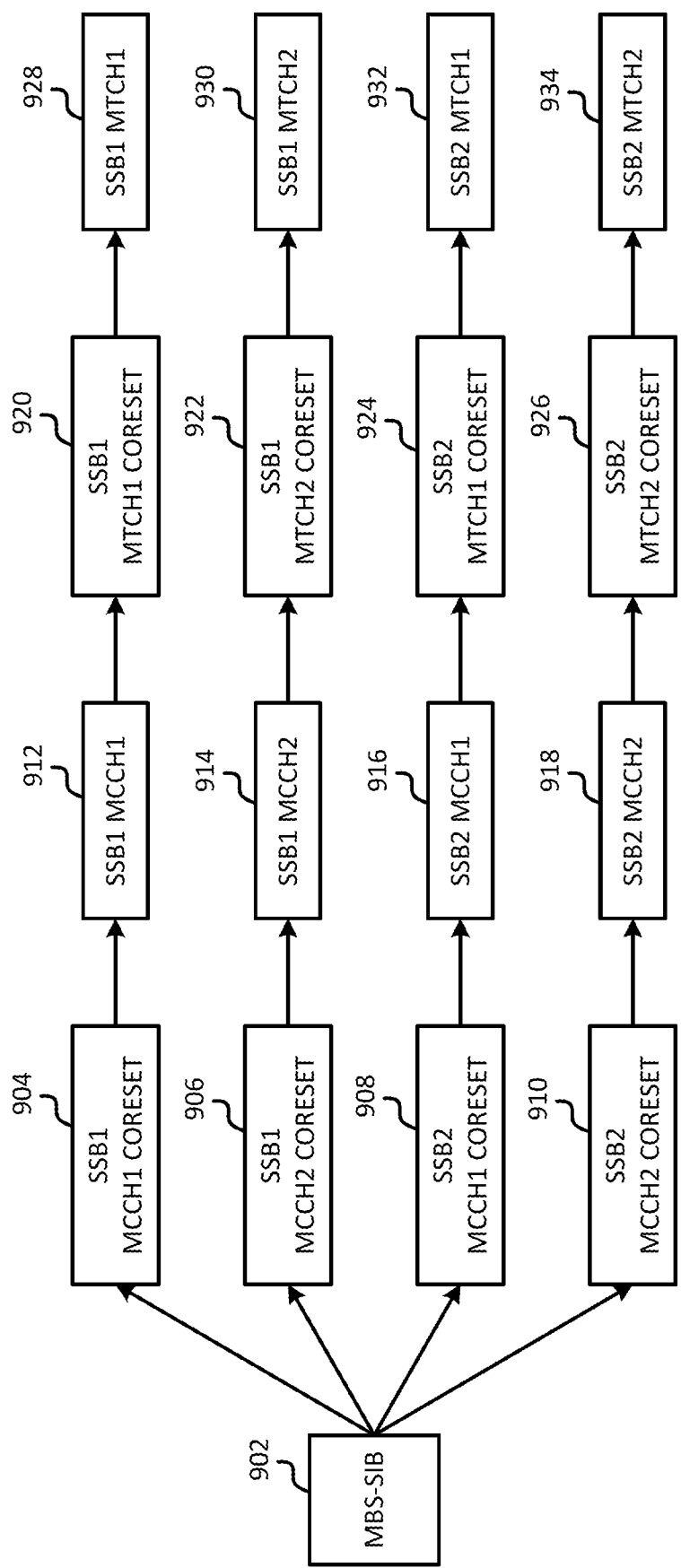
FIG. 9 is a diagram that illustrates an association relationship between MCCHs and MTCHs in a case of multi-beam operation, according to an implementation of the present disclosure.

FIG. 9 is a diagram that illustrates an association relationship between MCCHs and MTCHs in a case of multi-beam operation, according to an implementation of the present disclosure. The notations used in FIG. 9 follow the above definitions that are at least applied in FIG. 6A and FIG. 8. In addition, the following definition is also applied:

SSBn MCCHm CORESET: an MCCH CORESET which may be applied by the gNB for transmitting a DL assignment via a beam (e.g., beamn) associated with the SSBn, wherein the MCCH CORESET is configured by the gNB for a particular MBS session/service (e.g., MBS session m).

As illustrated in FIG. 9, the SSB1 MCCH1 912 and the SSB1 MCCH2 914 may be scheduled by the gNB via different CORESETs (e.g., the SSB1 MCCH1 CORESET 904 and the SSB1 MCCH2 CORESET 906). Similarly, the SSB2 MCCH1 916 and the SSB2 MCCH2 918 may be scheduled by the gNB via different CORESETs (e.g., the SSB2 MCCH1 CORESET 908 and the SSB1 MCCH2 CORESET 910).

The gNB may provide one or more beam-specific and MBS-session specific MCCH configurations in the MBS-SIB 902. For example, within a cell, the gNB is capable of transmitting two DL beams (e.g., beam1 and beam2), where beam 1 is associated with the SSB1 and beam 2 is associated with SSB2. The gNB may also provide at least two MBS sessions. The MBS-SIB 902 transmitted by the gNB may include four MCCH configurations (e.g., MCCH configuration 1, MCCH configuration 2, MCCH configuration 3, and MCCH configuration 4). The MCCH configuration 1 may configure the UE with the SSB1 MCCH1 CORESET 904. The MCCH configuration 2 may configure UE with the SSB1 MCCH2 CORESET 906. The MCCH configuration 3 may configure the UE with the SSB2 MCCH1 CORESET 908. The MCCH configuration 4 may configure the UE with the SSB2 MCCH2 CORESET 910.

The SSB1 MTCH1 CORESET 920, which is determined from the SSB1 MCCH1 912, schedules the SSB1 MTCH1 928. The SSB1 MTCH2 CORESET 922, which is determined from the SSB1 MCCH2 914, schedules the SSB1 MTCH2 930. The SSB2 MTCH1 CORESET 924, which is determined from the SSB2 MCCH1 916, schedules the SSB2 MTCH1 932. The SSB2 MTCH2 CORESET 926, which is determined from the SSB2 MCCH2 918, schedules the SSB2 MTCH2 934.

From the UE's perspective, the UE may select an MTCH-CORESET and/or an MCCH-CORESET for PDCCH monitoring by performing SSB detection and measurement.

Indication of SSB for Serving MBS

As mentioned above, NR supports multi-beam operation to enable the gNB to apply multiple (DL) beams to serve a set of UEs. For example, a gNB may have four DL beams for transmitting the MIB, SIB1, and/or MBS-SIB. However, the gNB may not use all of the four beams to provide MBS service(s). That is, the gNB may only use a subset of the four beams to perform transmissions on the MCCH and/or the MTCH. In view of this finding, the gNB may include a corresponding indicator in the MBS-SIB and/or the MCCH message to indicate to the UE which of the SSBs/beams is used by the gNB to transmit the MCCH and/or the MTCH.

In some implementations, the indicator may be, but is not limited to, a bitmap where each bit in the bitmap is associated with a respective SSB index (and/or a respective beam index) arranged in a predefined order (e.g., an ascending/descending order).

In some implementations, each bit of the bitmap may be associated with a respective SSB index (and/or a respective beam index) applied for transmitting the MIB, SIB1, and/or MBS-SIB, where the SSB index (and/or the beam index) may be arranged in an ascending/descending order. The SSB index and/or beam index, which are applied for transmitting the MIB, SIB1, and/or MBS-SIB, may be, but is not limited to be, indicated by the gNB in the MIB and/or the SIB1 (e.g., ssb-PositionsInBurst).

Configuration of MCCH/MTCH

In some implementations, the MCCH-CORESET, MCCH-searchspace, MTCH-CORESET, and/or MCCH-searchspace may be configured in an IE that configures the UE's MBS common frequency resource.

In some implementations, the MCCH-CORESET, MCCH-searchspace, MTCH-CORESET, and/or MCCH-searchspace may be configured in an IE that configures the UE's initial DL BWP (e.g., initialDownlinkBWP IE).

RRC Configuration of CORESET and Search Space

In NR, the behavior of PDCCH monitoring performed by the UE may be determined based on the CORESET configuration and the search space configuration (e.g., SearchSpace) which are provided by the gNB. That is, in addition to the configured CORESET, the gNB may further configure a UE with the search space configuration associated with the corresponding CORESET.

Figure 10:
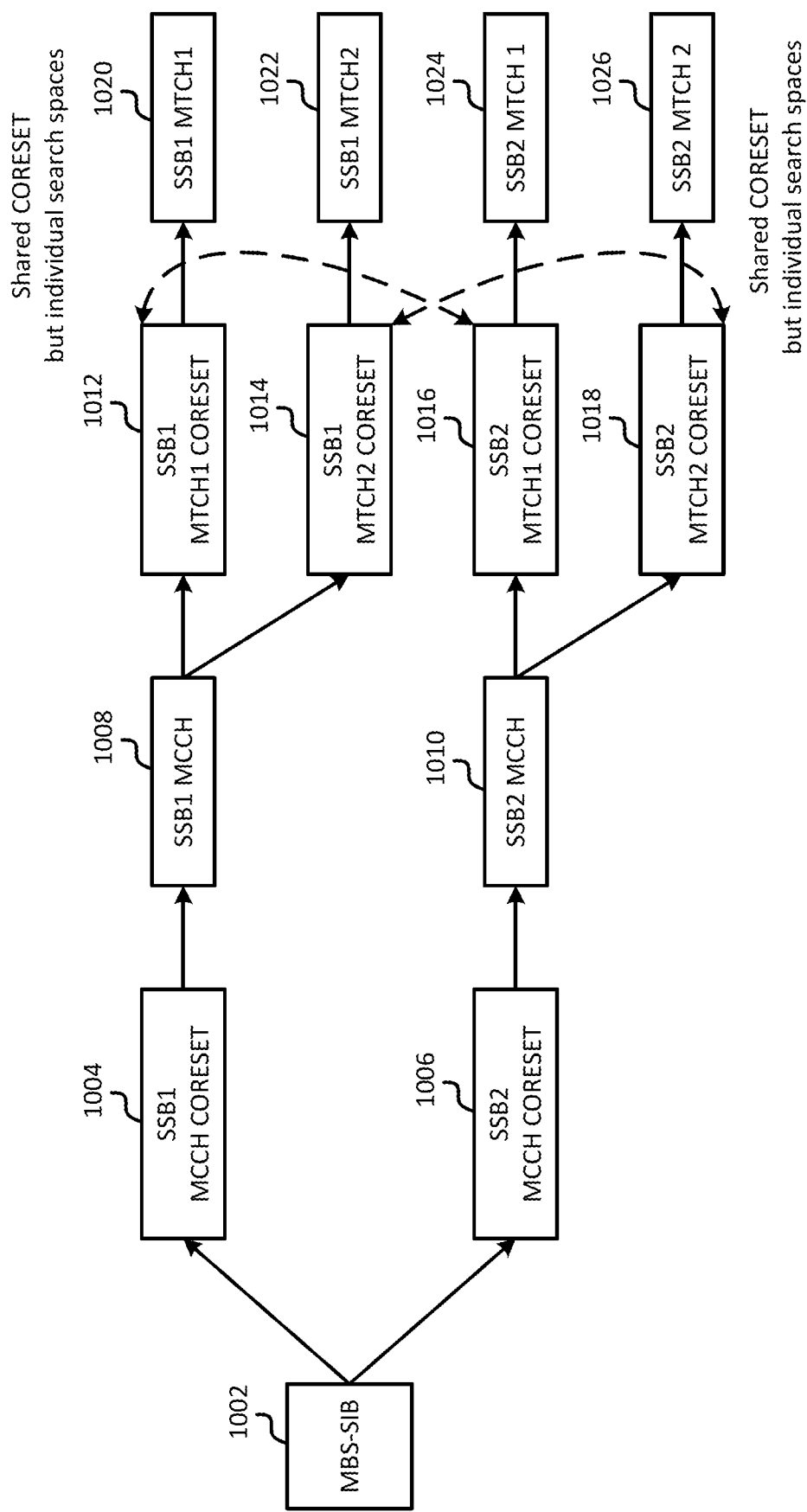
FIG. 10 is a diagram that illustrates CORESET sharing among different beams in a case of multi-beam operation, according to an implementation of the present disclosure.

FIG. 10 is a diagram that illustrates CORESET sharing among different beams in a case of multi-beam operation, according to an implementation of the present disclosure. The notations used in FIG. 10 follow the above definitions that are at least applied in FIG. 6A and FIG. 8.

The association relationship among the MCCHs and the MTCHs in FIG. 10 is similar to that illustrated in FIG. 6A. That is, the gNB may provide one or more beam-specific MCCH configurations in the MBS-SIB 1002. The UE may derive the resource locations of the SSB1 MCCH CORESET 1004 and the SSB2 MCCH CORESET 1006 from the MBS-SIB 1002, where the SSB1 MCCH CORESET 1004 and the SSB2 MCCH CORESET 1006 are used to schedule the DL reception on the SSB1 MCCH 1008 and the SSB2 MCCH 1010, respectively. The UE may receive MCCH messages on the SSB1 MCCH 1008 and the SSB2 MCCH 1010, and use the MCCH messages to derive the resource locations of the SSB1 MTCH1 CORESET 1012, the SSB1 MTCH2 CORESET 1014, the SSB2 MTCH1 CORESET 1016, and the SSB2 MTCH2 CORESET 1018, where the SSB1 MTCH1 CORESET 1012 and the SSB1 MTCH2 CORESET 1014 are used for scheduling MBS data on the SSB1 MTCH1 1020 and the SSB1 MTCH2 1022, respectively, and the SSB2 MTCH1 CORESET 1016 and the SSB2 MTCH2 CORESET 1018 are used for scheduling MBS data on the SSB2 MTCH1 1024 and the SSB2 MTCH2 1026, respectively.

The gNB may additionally configure the UE with a first SearchSpace associated with the SSB1 MTCH1 CORESET 1012 and configure a second SearchSpace associated with the SSB2 MTCH1 CORESET 1016 for PDCCH monitoring.

However, in order to increase the resource utilization ratio, the gNB may reuse the radio resource configured for the SSB1 MTCH1 CORESET 1012 to configure the radio resource for the SSB2 MTCH1 CORESET 1016. For example, the gNB may indicate to the UE a single MTCH CORESET configuration for PDCCH monitoring, so as to enable the UE to receive MTCHs transmitted by different (DL) beams associated with a single MBS session. The gNB may further indicate to the UE different search space configurations for each MTCH CORESET. For example, the SSB1 MTCH1 CORESET 1012 may be the same as the SSB2 MTCH1 CORESET 1016, but the PDCCH monitoring on the SSB1 MTCH1 CORESET 1012 and the PDCCH monitoring on the SSB2 MTCH1 CORESET 1016 are determined based on individual second search space configurations. That is, the UE is configured with a first SearchSpace associated with beam 1 (e.g., SSB1 MTCH1 CORESET 1012) and is configured with a second SearchSpace associated with beam 2 (e.g., SSB2 MTCH1 CORESET 1016) for PDCCH monitoring for MTCH reception. Similarly, the SSB1 MTCH2 CORESET 1014 may be same as the SSB2 MTCH2 CORESET 1018. The UE is configured with a third SearchSpace associated with beam 1 (e.g., SSB1 MTCH2 CORESET 1014) and is configured with a fourth SearchSpace associated with beam 2 (e.g., SSB2 MTCH2 CORESET 1018) for PDCCH monitoring for MTCH reception. Through the MCCH message transmitted on the SSB1 MCCH 1008, the gNB may indicate to the UE that the SSB1 MTCH1 CORESET 1012 and the SSB2 MTCH1 CORESET 1016 are referring to the same CORESET configuration (e.g., associated with the same CORESET ID), and that the SSB1 MTCH2 CORESET 1014 and the SSB2 MTCH2 CORESET 1018 are referring to the same CORESET configuration (e.g., associated with the same CORESET ID). Through the MCCH message transmitted on the SSB2 MCCH 1010, the gNB may indicate to the UE that the SSB2 MTCH1 CORESET 1016 and SSB1 MTCH1 CORESET 1012 are referring to the same CORESET configuration (e.g., associated with the same CORESET ID), and that the SSB2 MTCH2 CORESET 1018 and the SSB1 MTCH2 CORESET 1014 are refer to the same CORESET configuration (e.g., associated with the same CORESET ID).

In order to further reduce the signaling overhead and reduce the complexity on RRC signaling, all MTCH CORESETs associated with different DL beams and configured for the same MBS session may share the CORESET configuration and the search space configuration. However, the PDCCH monitoring occasions determined by the CORESET configuration and the search space configuration are sequentially (in the time domain) mapped to the MTCH CORESETs transmitted by each DL beam (e.g., SSB) in turn. That is, the $[xxN+K]^{th}$ PDCCH monitoring occasion(s) determined by the CORESET configuration and the search space configuration corresponds to the $K^{th}$ transmitted DL beam (e.g., SSB), where x=0, 1, ... X−1; K=1, 2, ... N; N is the number of actual transmitted DL beams (e.g., SSBs) determined by SIB1 and/or MBS-SIB and/or the MCCH message; and X is equal to CEIL(number of PDCCH monitoring occasions in a specific period/N), where the specific period may be preconfigured by the gNB in the MCCH message and/or the MCCH configuration and/or the MBS-SIB and/or SIB 1. In some implementations, the $y^{th}$ PDCCH monitoring occasion(s) determined by the CORESET configuration and the search space configuration corresponds to the $((y \bmod N)+1)^{th}$ transmitted DL beam (e.g., SSB), where N is the number of actual transmitted DL beams (e.g., SSBs) determined by SIB1 and/or MBS-SIB and/or the MCCH message. It is noted that the first PDCCH monitoring occasion may be determined based on at least one of the following factors (1) to (4):

(1) an MBS session activation command indicated by the gNB;
(2) an offset with unit of system frame or subframe or slot or symbol;
(3) an SFN number (index); and
(4) a time duration in which an onDurationTimer (as defined in 3GPP TS 38.331) of MTCH is running.

Figure 11:
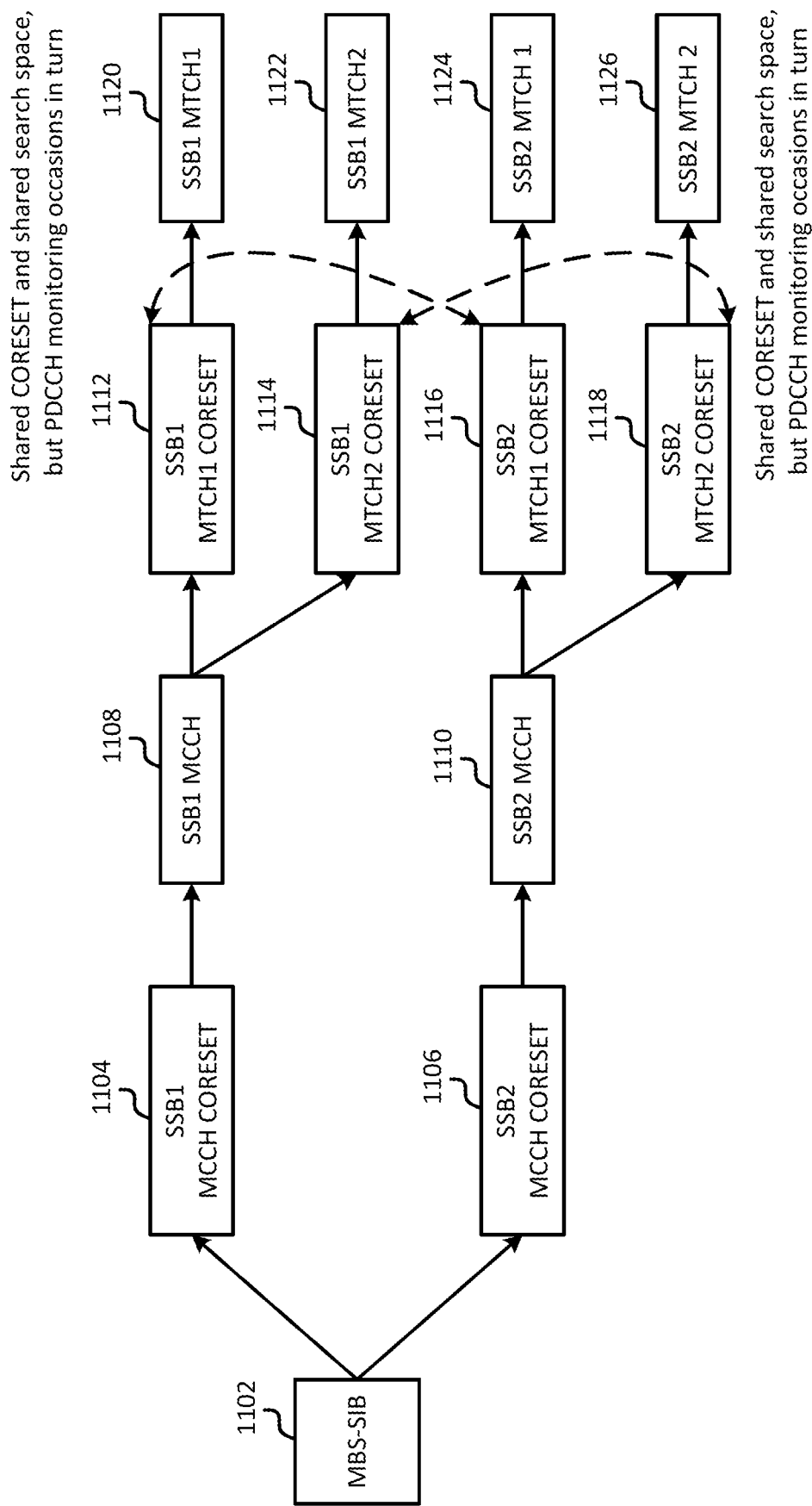
FIG. 11 is a diagram that illustrates CORESET sharing among different beams in a case of multi-beam operation, according to an implementation of the present disclosure.

FIG. 11 is a diagram that illustrates CORESET sharing among different beams in a case of multi-beam operation, according to an implementation of the present disclosure. The notations used in FIG. 11 follow the above definitions that are at least applied in FIG. 6A and FIG. 8.

The association relationship among the MCCHs and the MTCHs in FIG. 11 is similar to that illustrated in FIG. 6A. That is, the gNB may provide one or more beam-specific MCCH configurations in the MBS-SIB 1102. The UE may derive the resource locations of the SSB1 MCCH CORESET 1104 and the SSB2 MCCH CORESET 1106 from the MBS-SIB 1102, where the SSB1 MCCH CORESET 1104 and the SSB2 MCCH CORESET 1106 are used to schedule the DL reception on the SSB1 MCCH 1108 and the SSB2 MCCH 1110, respectively. The UE may receive MCCH messages on the SSB1 MCCH 1108 and the SSB2 MCCH 1110 and use the MCCH messages to derive the resource locations of the SSB1 MTCH1 CORESET 1112, the SSB1 MTCH2 CORESET 1114, the SSB2 MTCH1 CORESET 1116, and the SSB2 MTCH2 CORESET 1118, where the SSB1 MTCH1 CORESET 1112 and the SSB1 MTCH2 CORESET 1114 are used for scheduling MBS data on the SSB1 MTCH1 1120 and the SSB1 MTCH2 1122, respectively, and the SSB2 MTCH1 CORESET 1116 and the SSB2 MTCH2 CORESET 1118 are used for scheduling MBS data on the SSB2 MTCH1 1124 and the SSB2 MTCH2 1126, respectively.

The gNB may reuse the radio resource configured for the SSB1 MTCH1 CORESET 1112 to configure the radio resource for the SSB2 MTCH1 CORESET 1116. That is, the gNB may indicate to the UE a single MTCH CORESET configuration for PDCCH monitoring for the MTCHs transmitted by the gNB through different beams associated with a single MBS session. In addition, the gNB may indicate to the UE a single search space configuration for each MTCH CORESET. For example, the SSB1 MTCH1 CORESET 1112 may be the same as the SSB2 MTCH1 CORESET 1116, and the PDCCH monitoring on the SSB1 MTCH1 CORESET 1112 and on the SSB2 MTCH1 CORESET 1116 may be based on the same search space configuration (e.g., SearchSpace). However, the PDCCH monitoring occasions determined from the MTCH CORESET configuration and the search space configuration are sequentially (in the time domain) mapped to the MTCH CORESETs transmitted by different DL beams (e.g., SSBs) in turn. That is, the UE is configured with a SearchSpace associated with beam 1 (e.g., SSB1 MTCH1 CORESET 1112) and beam 2 (e.g., SSB2 MTCH1 CORESET 1116) for PDCCH monitoring for MTCH reception. The PDCCH monitoring occasions determined by the CORESET configuration and the SearchSpace are applied by the UE for PDCCH monitoring for the MTCHs associated with the same MBS session and transmitted by different DL beams in turn. Similarly, the SSB1 MTCH2 CORESET 1114 may be the same as the SSB2 MTCH2 CORESET 1118. In addition, the UE is configured with a SearchSpace associated with beam 1 (e.g., SSB1 MTCH2 CORESET 1114) and beam 2 (e.g., SSB2 MTCH2 CORESET 1118) for PDCCH monitoring for MTCH reception. That is, the UE is configured with a SearchSpace associated with beam 1 (e.g., SSB1 MTCH2 CORESET 1114) and beam 2 (e.g., SSB2 MTCH2 CORESET 1118) for PDCCH monitoring for MTCH reception. The PDCCH monitoring occasions determined by the CORESET configuration and the SearchSpace are applied by the UE for PDCCH monitoring for MTCHs associated with the same MBS session and transmitted by different DL beams in turn. That is, in the MCCH message transmitted on the SSB1 MCCH 1108, the gNB may indicate to the UE that the SSB1 MTCH1 CORESET 1112 and the SSB2 MTCH1 CORESET 1116 refer to the same CORESET configuration (e.g., associated with the same CORESET ID) and the same search space configuration (e.g., associated with the same SearchSpace ID), and the SSB1 MTCH2 CORESET 1114 and the SSB2 MTCH2 CORESET 1118 may refer to the same CORESET configuration (e.g., associated with the same CORESET ID) and the same search space configuration (e.g., associated with the same SearchSpace ID). In the MCCH message transmitted on the SSB2 MCCH 1110, the gNB may indicate to the UE that the SSB2 MTCH1 CORESET 1116 and the SSB1 MTCH1 CORESET 1112 may refer to the same CORESET configuration (e.g., associated with the same CORESET ID) and the same search space configuration (e.g., associated with the same SearchSpace ID)), and that the SSB2 MTCH2 CORESET 1118 and the SSB1 MTCH2 CORESET 1114 may refer to the same CORESET configuration (e.g., associated with the same CORESET ID) and the same search space configuration (e.g., associated with the same SearchSpace ID).

Figure 12:
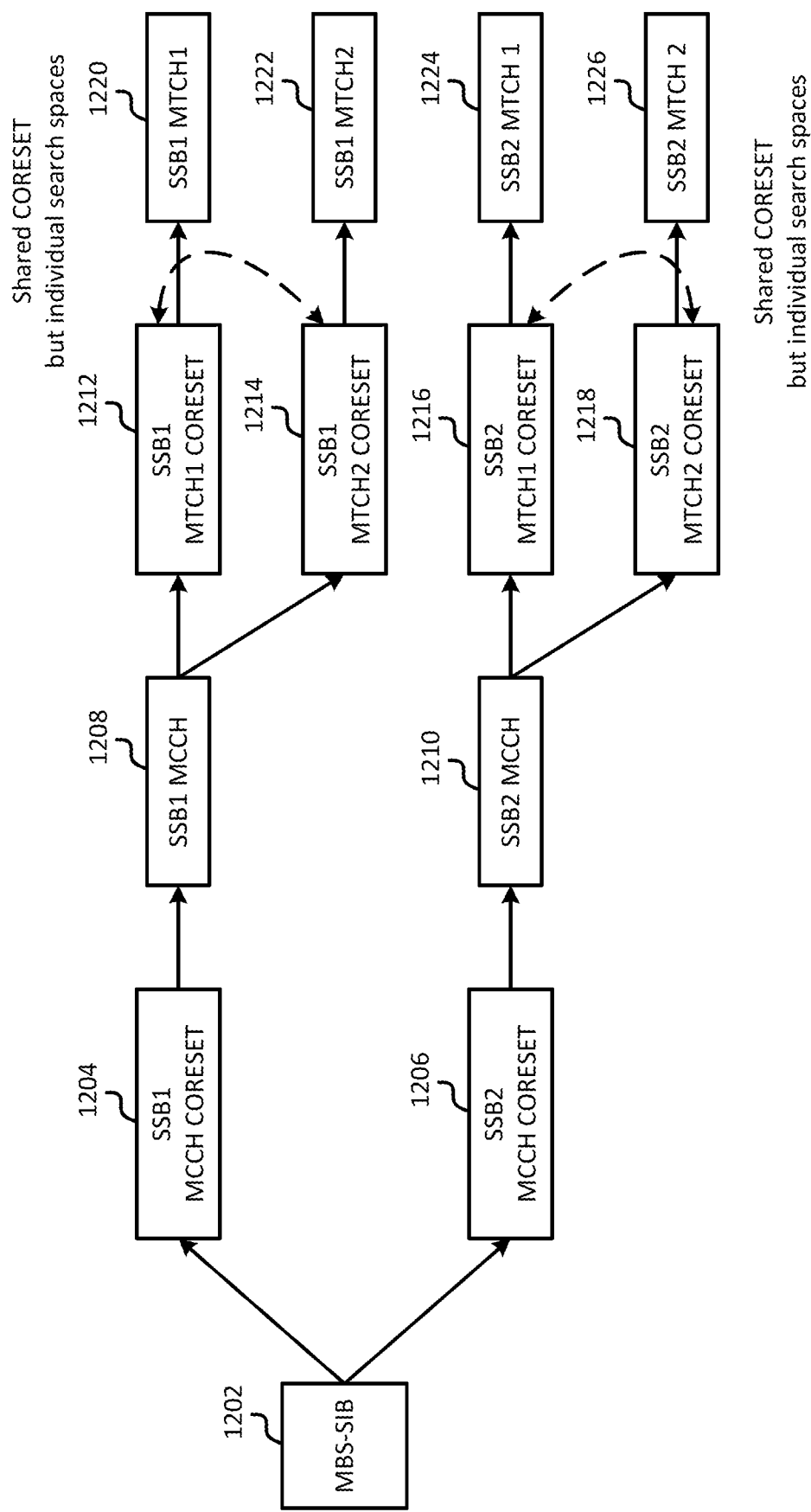
FIG. 12 is a diagram illustrating CORESET sharing among different MBS sessions in a case of multi-beam operation, according to an implementation of the present disclosure.

FIG. 12 is a diagram illustrating CORESET sharing among different MBS sessions in a case of multi-beam operation, according to an implementation of the present disclosure. The notations used in FIG. 12 follow the above definitions that are at least applied in FIG. 6A and FIG. 8.

The association relationship among the MCCHs and the MTCHs in FIG. 12 is similar to that illustrated in FIG. 6A. That is, the gNB may provide one or more beam-specific MCCH configurations in the MBS-SIB 1202. The UE may derive the resource locations of the SSB1 MCCH CORESET 1204 and the SSB2 MCCH CORESET 1206 from the MBS-SIB 1202, where the SSB1 MCCH CORESET 1204 and the SSB2 MCCH CORESET 1206 are used to schedule the DL reception on the SSB1 MCCH 1208 and the SSB2 MCCH 1210, respectively. The UE may receive MCCH messages on the SSB1 MCCH 1208 and the SSB2 MCCH 1210 and use the MCCH messages to derive the resource locations of the SSB1 MTCH1 CORESET 1212, the SSB1 MTCH2 CORESET 1214, the SSB2 MTCH1 CORESET 1216, and the SSB2 MTCH2 CORESET 1218, where the SSB1 MTCH1 CORESET 1212 and the SSB1 MTCH2 CORESET 1214 are used for scheduling MBS data on the SSB1 MTCH1 1220 and the SSB1 MTCH2 1222, respectively, and the SSB2 MTCH1 CORESET 1216 and the SSB2 MTCH2 CORESET 1218 are used for scheduling MBS data on the SSB2 MTCH1 1224 and the SSB2 MTCH2 1226, respectively.

The gNB may additionally configure the UE with a first SearchSpace associated with the SSB1 MTCH1 CORESET 1212 and a second SearchSpace associated with the SSB1 MTCH2 CORESET 1214 for PDCCH monitoring for MTCH reception.

In order to increase resource utilization ratio, the gNB may reuse the radio resource configured for the SSB1 MTCH1 CORESET 1212 to configure the radio resource for the SSB1 MTCH2 CORESET 1214. For example, the gNB may indicate to the UE only a single MTCH CORESET configuration for PDCCH monitoring for MTCH(s) (which may be associated with different MBS sessions) transmitted by the same beam. The gNB may also indicate to the UE different search space configurations for each the MTCH(s) associated with different MBS sessions. For example, the SSB1 MTCH1 CORESET 1212 may be the same as SSB1 MTCH2 CORESET 1214, but the PDCCH monitoring (occasions) on the SSB1 MTCH1 CORESET 1212 and on the SSB1 MTCH2 CORESET 1214 may be determined based on individual search space configurations. For example, the UE is configured with a first SearchSpace associated with MTCH1 (e.g., SSB1 MTCH1 CORESET 1212) and configure a second SearchSpace associated with MTCH2 (e.g., SSB1 MTCH2 CORESET 1214) for PDCCH monitoring for MTCH reception. Similarly, the SSB2 MTCH1 CORESET 1216 may be the same as the SSB2 MTCH2 CORESET 1218, but the UE is configured with a third SearchSpace associated with MTCH1 (e.g., SSB2 MTCH1 CORESET 1216), and configure a fourth SearchSpace associated with MTCH2 (e.g., SSB2 MTCH2 CORESET 1218) for PDCCH monitoring for MTCH reception. For example, in the MCCH message transmitted on the SSB1 MCCH 1208, the gNB may indicate to the UE that the SSB1 MTCH1 CORESET 1212 and the SSB1 MTCH2 CORESET 1214 refer to the same CORESET configuration (e.g., associated with the same CORESET ID), and/or that the SSB2 MTCH1 CORESET 1216 and the SSB2 MTCH2 CORESET 1218 refer to the same CORESET configuration (e.g., associated with the same CORESET ID). In the MCCH message transmitted on the SSB2 MCCH 1210, the gNB may indicate to the UE that the SSB2 MTCH1 CORESET 1216 and the SSB2 MTCH2 CORESET 1218 refer to the same CORESET configuration (e.g., associated with the same CORESET ID), and/or the SSB1 MTCH1 CORESET 1212 and the SSB1 MTCH2 CORESET 1214 are refer to the same CORESET configuration (e.g., associated with the same CORESET ID).

In order to further reduce signaling overhead and reduce the complexity on RRC signaling, all MTCH CORESETs associated with the same DL beam may share the same CORESET configuration and the search space configuration. However, the PDCCH monitoring occasions determined from the CORESET configuration and the search space configuration may be sequentially (in the time domain) mapped to the MTCH CORESETs associated with different MBS sessions (e.g., MTCHs) in turn. For example, the $[x \times N+K]^{th}$ PDCCH monitoring occasion(s) determined by the CORESET configuration and the search space configuration corresponds to the $K^{th}$ MBS session (e.g., MTCH K), where x=0, 1, . . . X−1; K=1, 2, . . . N; N is the number of MBS session determined by SIB1 and/or MBS-SIB and/or MCCH message; and X is equal to CEIL(number of PDCCH monitoring occasions in a specific period/N), where the specific period may be preconfigured by the gNB in the MCCH message and/or the MCCH configuration and/or the MBS-SIB and/or SIB 1. In some implementations, the $y^{th}$ PDCCH monitoring occasion(s) determined from the CORESET configuration and the search space configuration corresponds to the $((y \mod N)+1)^{th}$ MBS session (e.g., MTCH ((y mod N)+1)), where N is the number of MBS session (e.g., MTCH) determined from SIB1 and/or MBS-SIB and/or MCCH message. The first PDCCH monitoring occasion may be determined based on at least one of the following factors (1) to (4):

(1) an MBS session activation command indicated by the gNB;
(2) an offset with unit of system frame or subframe or slot or symbol;
(3) an SFN number (index); and
(4) a time duration in which an onDurationTimer (as defined in 3GPP TS 38.331) of MTCH is running.

Figure 13:
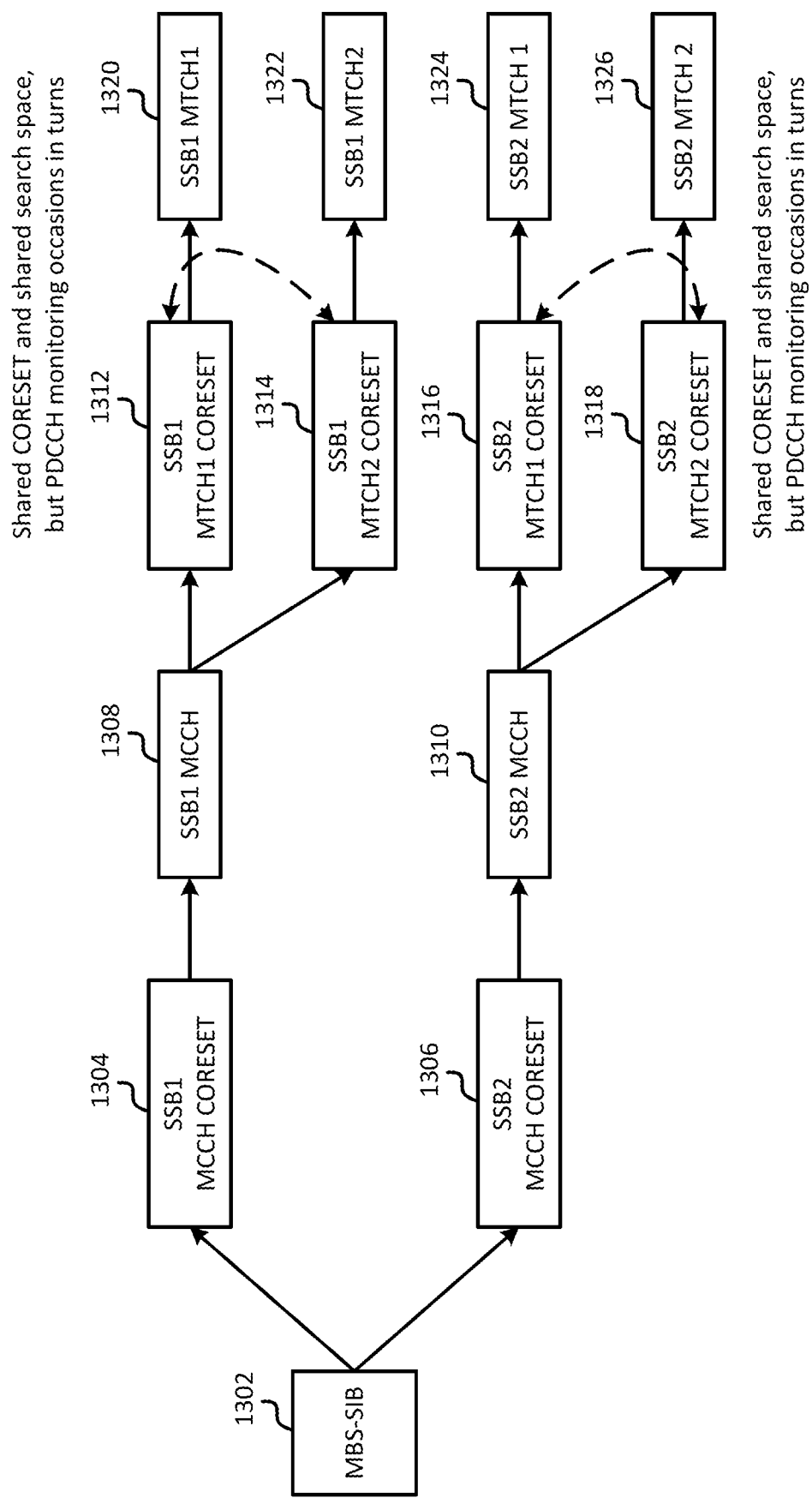
FIG. 13 is a diagram illustrating CORESET sharing among different MBS sessions in a case of multi-beam operation, according to an implementation of the present disclosure.

FIG. 13 is a diagram illustrating CORESET sharing among different MBS sessions in a case of multi-beam operation, according to an implementation of the present disclosure. The notations used in FIG. 13 follow the above definitions that are at least applied in FIG. 6A and FIG. 8.

The association relationship among the MCCHs and the MTCHs in FIG. 13 is similar to that illustrated in FIG. 6A. That is, the gNB may provide one or more beam-specific MCCH configurations in the MBS-SIB 1302. The UE may derive the resource locations of the SSB1 MCCH CORESET 1304 and the SSB2 MCCH CORESET 1306 from the MBS-SIB 1302, where the SSB1 MCCH CORESET 1304 and the SSB2 MCCH CORESET 1306 are used to schedule the DL reception on the SSB1 MCCH 1308 and the SSB2 MCCH 1310, respectively. The UE may receive MCCH messages on the SSB1 MCCH 1308 and the SSB2 MCCH 1310 and use the MCCH messages to derive the resource locations of the SSB1 MTCH1 CORESET 1312, the SSB1 MTCH2 CORESET 1314, the SSB2 MTCH1 CORESET 1316, and the SSB2 MTCH2 CORESET 1318, where the SSB1 MTCH1 CORESET 1312 and the SSB1 MTCH2 CORESET 1314 are used for scheduling MBS data on the SSB1 MTCH1 1320 and the SSB1 MTCH2 1322, respectively, and the SSB2 MTCH1 CORESET 1316 and the SSB2 MTCH2 CORESET 1318 are used for scheduling MBS data on the SSB2 MTCH1 1324 and the SSB2 MTCH2 1326, respectively.

The gNB may reuse the radio resource configured for the SSB1 MTCH1 CORESET 1312 to configure the radio resource for the SSB1 MTCH2 CORESET 1314. For example, the gNB may indicate to the UE a single MTCH CORESET configuration and a single search space configuration for PDCCH monitoring for the MTCHs transmitted by the same beam but associated with different MBS sessions. For example, the SSB1 MTCH1 CORESET 1312 may be the same as the SSB1 MTCH2 CORESET 1314, and the PDCCH monitoring occasions on the SSB1 MTCH1 CORESET 1312 and on the SSB1 MTCH2 CORESET 1314 may be determined based on the same search space configuration (e.g., SearchSpace). However, the PDCCH monitoring occasions determined from the MTCH CORESET configuration and the search space configuration are sequentially (in the time domain) mapped to MTCH CORESETs associated with the MBS sessions transmitted by the same DL beam in turn. For example, the UE is configured with a SearchSpace associated with MBS session 1 (e.g., SSB1 MTCH1 CORESET 1312) and MBS session 2 (e.g., SSB1 MTCH2 CORESET 1314) for PDCCH monitoring for MTCH reception. The PDCCH monitoring occasions determined from the CORESET configuration and the SearchSpace are applied by the UE for PDCCH monitoring for the MTCHs transmitted by the same DL beam and associated with different MBS sessions in turn. Similarly, the SSB2 MTCH1 CORESET 1316 may be the same as the SSB2 MTCH2 CORESET 1318. In addition, the UE is configured with a SearchSpace associated with MBS session 1 (e.g., SSB2 MTCH1 CORESET 1316) and MBS session 2 (e.g., SSB2 MTCH2 CORESET 1318) for PDCCH monitoring for MTCH reception. For example, the UE is configured with a SearchSpace associated with MBS session 1 (e.g., SSB2 MTCH1 CORESET 1316) and MBS session 2 (e.g., SSB2 MTCH2 CORESET 1318) for PDCCH monitoring for MTCH reception. The PDCCH monitoring occasions determined from the CORESET configuration and the SearchSpace are applied by the UE for PDCCH monitoring for the MTCHs associated with the MBS sessions and transmitted by the same DL beam in turn. In the MCCH message transmitted on the SSB1 MCCH 1308, the gNB may indicate to the UE that the SSB1 MTCH1 CORESET 1312 and the SSB1 MTCH2 CORESET 1314 refer to the same CORESET configuration (e.g., associated with the same CORESET ID) and same search space configuration (e.g., associated with the same SearchSpace ID), and the SSB2 MTCH1 CORESET 1316 and the SSB2 MTCH2 CORESET 1318 refer to the same CORESET configuration (e.g., associated with the same CORESET ID) and the same search space configuration (e.g., associated with the same SearchSpace ID). In the MCCH message transmitted on the SSB2 MCCH 1310, the gNB may indicate to the UE that the SSB2 MTCH1 CORESET 1316 and the SSB2 MTCH2 CORESET 1318 refer to the same CORESET configuration (e.g., associated with the same CORESET ID) and the same search space configuration (e.g., associated with the same SearchSpace ID)), and the SSB1 MTCH1 CORESET 1312 and the SSB1 MTCH2 CORESET 1314 refer to the same CORESET configuration (e.g., associated with the same CORESET ID) and same search space configuration (e.g., associated with the same SearchSpace ID).

RRC Configuration of Multiple MCCHs

To isolate the RRC configurations of different MBS sessions for reducing signaling overhead on each MCCH CORESET and on each MCCH message, a gNB may provide the UE with an MCCH configuration corresponding to different MBS sessions via different MCCH messages transmitted on different MCCHs. The MCCHs corresponding to different MBS sessions may be scheduled from different MCCH CORESETs. In some implementations, the MCCHs corresponding to different MBS sessions may be scheduled via different types of RNTI. In some implementations, the MCCHs corresponding to different MBS sessions may be scheduled via different MCCH CORESETs. When the multiple-MCCH concept is introduced, the PDCCH monitoring occasions within an MCCH modification period may be mapped with the MCCH CORESETs associated with different SSBs and different MBS sessions.

Figures 14, 15:
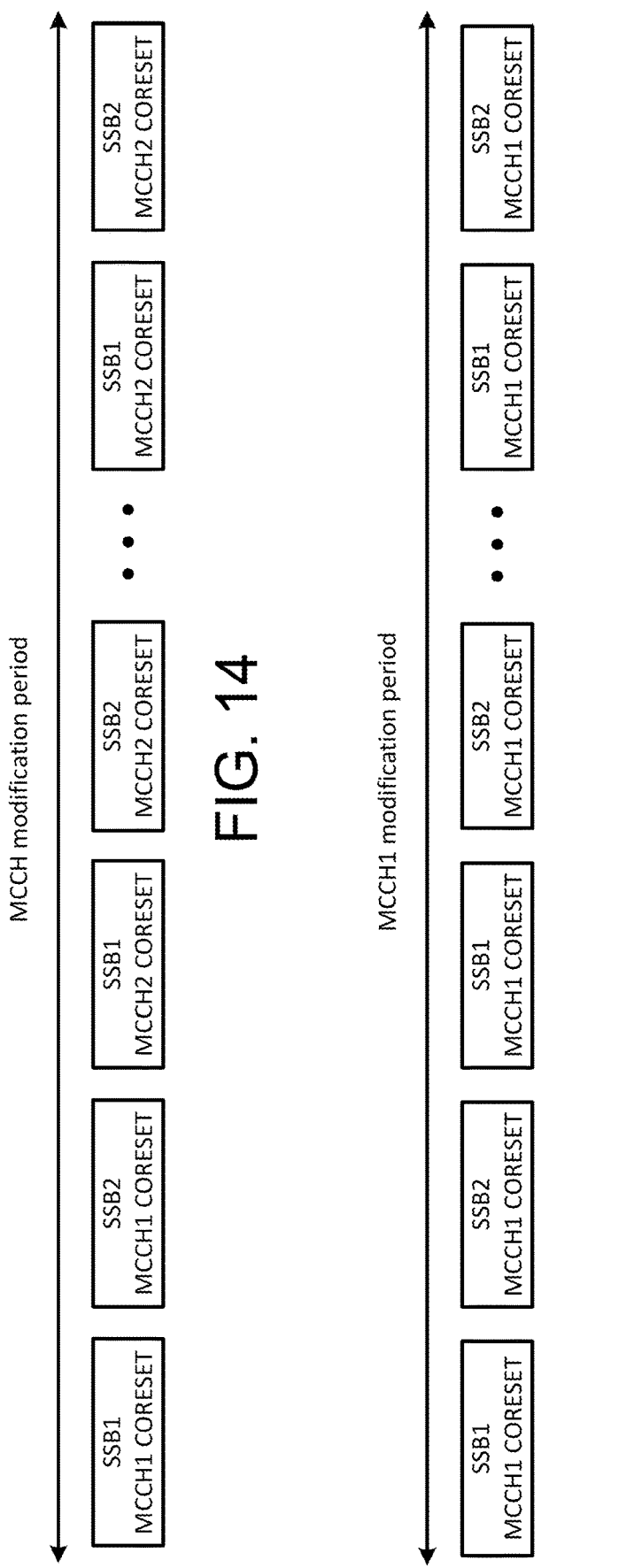
FIG. 14 is a timing diagram illustrating an MCCH modification period, according to an implementation of the present disclosure.
FIG. 15 is a timing diagram illustrating an MCCH modification period, according to an implementation of the present disclosure.

FIG. 14 is a timing diagram illustrating an MCCH modification period, according to an implementation of the present disclosure.

As shown in FIG. 14, the PDCCH monitoring occasions within the MCCH modification period are sequentially mapped with MCCH CORESETs (e.g., SSB1 MCCH1 CORESET and SSB2 MCCH2 CORESET) associated with different MBS sessions and different SSBs (e.g., SSB1 and SSB2). According to the sequential order, the gNB transmits the SSB1 MCCH1 CORESET, the SSB2 MCCH1 CORESET, the SSB1 MCCH2 CORESET, and the SSB2 MCCH2 CORESET sequentially. In this case, it is assumed that the gNB have two DL beams (associated with SSB1 and SSB2, respectively) in a beam-sweeping cycle and provides two MBS sessions (corresponding to MCCH1 and MCCH2, respectively) to the UE(s).

FIG. 15 is a timing diagram illustrating an MCCH modification period, according to an implementation of the present disclosure.

As illustrated in FIG. 15, the gNB may configure the UE with multiple MCCH modification periods (e.g., MCCH1 modification period and MCCH2 modification period) each associated with a respective MBS session. The PDCCH monitoring occasions within each MCCH modification period are sequentially mapped to the MCCH CORESETs associated with different SSBs. For example, in the MCCH1 modification period, the MCCH1 CORESETs that are corresponding to the MBS session 1 and provided on different beams (e.g., associated with SSB1 and SSB2, respectively) are transmitted in turn. As illustrated in FIG. 15, SSB1 MCCH1 CORESET and SSB2 MCCH1 CORESET are transmitted in turn within the MCCH1 modification period. For example, in the MCCH2 modification period, the MCCH2 CORESETs that are corresponding to the MBS session 2 and provided on different beams (e.g., associated with SSB1 and SSB2, respectively) are transmitted in turn. As illustrated in FIG. 15, SSB1 MCCH2 CORESET and SSB2 MCCH2 CORESET are transmitted in turn within the MCCH2 modification period.

Parameters provided by the gNB for indicating PDCCH monitoring occasions within an MCCH modification period associated with an MBS session may include at least one of the following:

(1) an offset with unit of system frame or subframe or slot or symbol; and (2) a duration with unit of system frame or subframe or slot or symbol.

MBS Data Acquisition on MTCH

In some implementations, once the UE receives (or is configured with) the MCCH configuration(s) and the MTCH configuration(s), the UE may monitor the PDCCH on a particular CORESET indicated by these configurations and perform MBS data reception accordingly. Through the multi-beam operation, selecting a MCCH/MTCH CORESET associated with a proper beam among all MCCH/MTCH CORESETs configured by the MCCH configurations and MTCH configurations may increase the quality of receiving the MBS data. Once the link quality degrades, enabling a UE to perform PDCCH monitoring on another MCCH/MTCH CORESET associated with another beam having better link quality may be advantageous.

Figure 16:
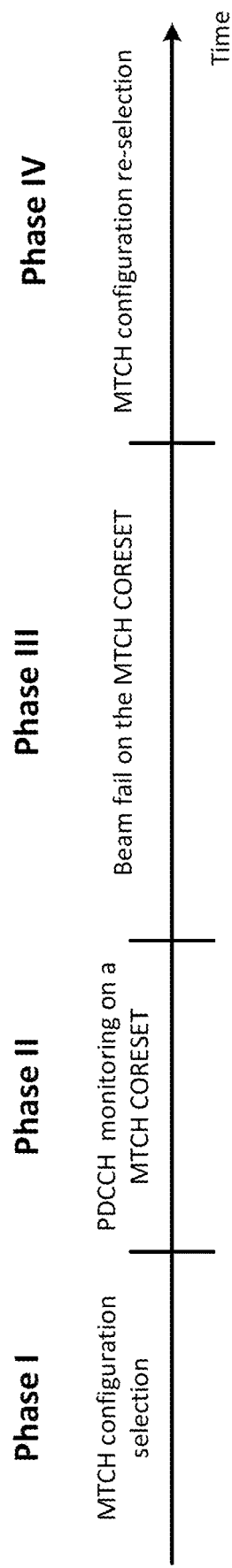
FIG. 16 is a timing diagram illustrating a process of MBS data reception, according to an implementation of the present disclosure.

FIG. 16 is a timing diagram illustrating a process of MBS data reception, according to an implementation of the present disclosure.

As illustrated in FIG. 16, the process may be split into four phases (e.g., phase I, phase II, phase III, and phase IV) in time domain:

Phase I: The UE receives a MTCH configuration from the gNB. The MTCH configuration contains at least one PDCCH configuration, each of which contains an MTCH specific CORESET configuration and an MTCH specific search space configuration. Each PDCCH configuration is associated with one DL beam (e.g., SSB). It is noted that a PDCCH configuration may be associated with an MBS session. Among the multiple PDCCH configurations, the UE may select one PDCCH configuration according to measurement on an SSB. That is, the UE may perform measurement on SSBs associated with each PDCCH configuration and compare the measurement results (e.g., Reference Signal Received Power (RSRP)) of each SSB with a threshold, wherein the threshold may be configured by the gNB in MBS-SIB and/or MCCH message. The UE may select one of the PDCCH configurations which is associated with an SSB measurement result that was higher than the threshold.

Phase II: The UE performs PDCCH monitoring on the PDCCH occasions indicated by the selected PDCCH configuration and its corresponding MTCH-specific CORESET configuration and MTCH-specific search space configuration. During the PDCCH monitoring and/or MBS data reception on MTCH, the UE may keep monitoring the link quality as well. That is, the UE may periodically measure a corresponding SSB and evaluate whether the link quality of the monitored CORESET has been degraded.

Phase III: While performing the link quality monitoring in Phase II, the UE may decide the link quality is worsening (e.g., a beam failed is occurred) based on at least one of the following factors:

(1) the number of times the MBS data decoding fails occurs, and/or the number of times has reached a particular threshold configured by the gNB in the MCCH message; and (2) the number of beam fail indicators the MAC layer of the UE has received from its lower layer, and/or the number of the received indicators has reached a particular threshold configured by the gNB in the MCCH message.

Phase IV: Once the beam fail occurred, the UE may trigger a particular procedure in order to switch to another MTCH CORESET for PDCCH monitoring. The particular procedure may be one of the following:

(1) a procedure to acquire an MBS-SIB;
(2) a procedure to acquire an MCCH configuration transmitted on the MBS-SIB;
(3) a procedure to acquire an MCCH message transmitted on the MCCH;
(4) a procedure to acquire an MTCH configuration transmitted in the MCCH message;
(5) a procedure to acquire SIB1; and
(6) a procedure that includes the UE performing SSB measurement and selecting a new SSB based on the measurement.

The procedure may further include one or more of the following operations:

(1) The UE discards the stored the MCCH configuration and applies the newly acquired MCCH configuration;
(2) the UE discards the stored MTCH configuration and applies the newly acquired MTCH configuration;
(3) the UE initiates a random-access procedure to resume the RRC connection with the gNB if the UE was in the RRC_INACTIVE state;
(4) the UE initiates a random-access procedure to establish an RRC connection with the gNB if the UE was in the RRC_IDLE state;
(5) the UE initiates a random-access procedure to resume the RRC connection with the gNB if the UE was in the RRC_INACTIVE state and there is no SSB with an RSRP higher than a pre-configured threshold; and
(6) the UE initiates a random-access procedure to establish an RRC connection with the gNB if the UE was in the RRC_IDLE state and there is no SSB with an RSRP higher than a pre-configured threshold.

In some implementations, once a UE receives from the gNB an indication that an MBS session is activated/started, the UE may trigger a particular procedure to start MBS data reception. The particular procedure may be one of the following:

(1) a procedure to acquire an MBS-SIB;
(2) a procedure to acquire an MCCH configuration transmitted on the MBS-SIB;
(3) a procedure to acquire an MCCH message transmitted on the MCCH;
(4) a procedure to acquire an MTCH configuration transmitted in the MCCH message;
(5) a procedure to acquire SIB1; and
(6) a procedure that includes the UE performing SSB measurement and selecting a new SSB based on the measurement.

If the UE has stored a corresponding MCCH configuration and/or MTCH configuration before receiving the indication that the MBS session is activated/started, the UE may discard the stored MCCH configuration and/or MTCH configuration provided by the gNB when moving to the coverage area of another gNB.

MBS SPS Configuration

In some implementations, a group-common SPS configuration is introduced. Different from the SPS configuration introduced in Release 15 of NR, the SPS configuration is configured for receiving MBS data and may be configured by the group signaling, for example, a broadcast RRC message. The activation and/or deactivation of a configured SPS configuration for MBS may be indicated by a group-common signaling. The group-common signaling may be a dynamic scheduling by a particular type of RNTI (e.g., G-CS-RNTI). The particular type of RNTI is introduced for activating and deactivating the configured SPS configuration for MBS. In order to let the gNB have the flexibility to activate and/or deactivate a configured SPS configuration for MBS via UE-specific signaling, the activation and/or deactivation of the configured SPS configuration for MBS may be indicated via a dynamic scheduling by a UE-specific RNTI (e.g., C-RNTI or CS-RNTI). The gNB may further indicate the activation and/or deactivation of the configured SPS configuration for MBS within one or more fields within a DCI with CRC bits scrambled by the C-RNTI or CS-RNTI. For activation of a group-common SPS configuration, the NDI field is set to 0 and the redundancy version field is set to all '0's in the activation DCI. For deactivation of a group-common SPS configuration, the NDI field is set to 0, the redundancy version field is set to all '0's, the modulation and coding scheme field is set to all '1's, and the frequency domain resource assignment (FDRA) field is set to all '0's for FDRA Type 0 or for dynamic switching of FDRA Type 0 and FDRA Type 1, and the FDRA field is set to all '1's for FDRA Type 1.

The SPS configuration index of a group-common SPS configuration may be configured in a UE-specific way. The SPS configuration indexes of group-common SPS configurations and SPS configurations dedicated for a UE may share the same pool of indices. When DCI with CRC scrambled by a UE-specific RNTI is used to activate or deactivate an SPS configuration, the UE may determine whether the activated or deactivated SPS configuration is a group-common SPS configuration or an SPS configuration dedicated for a UE based on the SPS configuration index indicated by the HARQ process number field in the activation DCI. When DCI with CRC scrambled by a UE-specific RNTI is used to activate a group-common SPS configuration, the PDSCH-Config for multicast that is different from the PDSCH-Config in a dedicated BWP configuration is applied. For example, for time domain resource allocation determination, pdsch-TimeDomainAllocationList in PDSCH-Config for multicast is used to interpret the TDRA field in the activation DCI. In another example, for frequency domain resource allocation determination, vrb-ToPRB-Interleaver and resourceAllocation in PDSCH-Config for multicast is used to interpret the FDRA field in the activation DCI.

Figure 17:
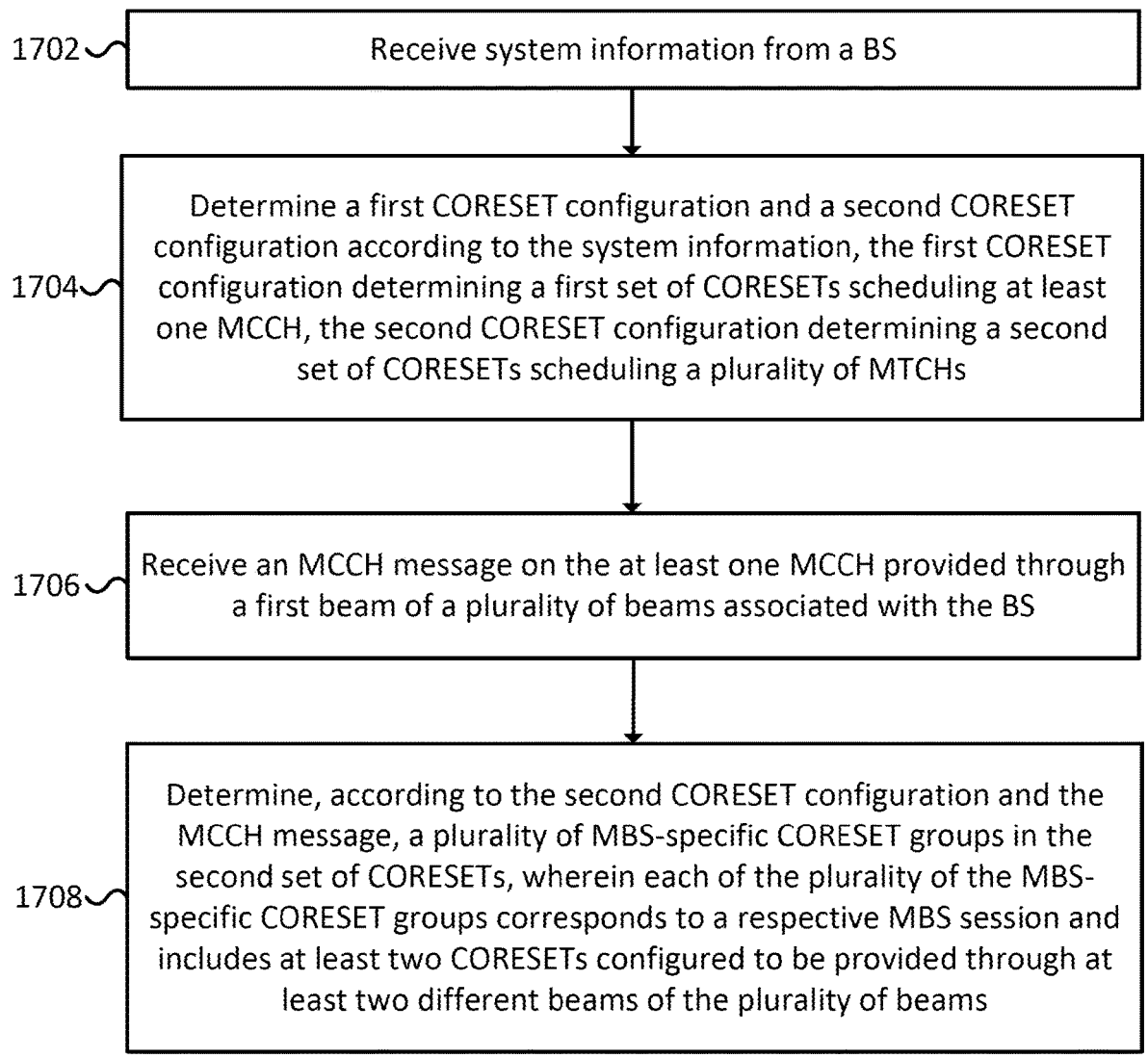
FIG. 17 is a flowchart of a method for management of MBS acquisition according to an implementation of the present disclosure.

FIG. 17 is a flowchart of a method 1700 for management of MBS acquisition according to an implementation of the present disclosure. Although actions 1702, 1704, 1706, and 1708 are illustrated as separate actions represented as independent blocks in FIG. 17, these separately illustrated actions should not be construed as necessarily order-dependent. The order in which the actions are performed in FIG. 17 is not intended to be construed as a limitation, and any number of the disclosed blocks may be combined in any order to implement the method, or an alternate method. Moreover, each of actions 1702, 1704, 1706, and 1708 may be performed independently of other actions, and can be omitted in some implementations of the present disclosure.

In action 1702, the UE may receive system information from a BS. For example, the system information may include MBS-related information and/or information from which the MBS-related information can be derived by the UE.

In action 1704, the UE may determine a first CORESET configuration and a second CORESET configuration according to the system information. The first CORESET configuration may be used to determine a first set of CORESETs (e.g., SSBn MCCH CORESETs) scheduling at least one MCCH. The second CORESET configuration may be used to determine a second set of CORESETs (e.g., SSBn MTCHm CORESET) scheduling a plurality of MTCHs.

In action 1706, the UE may receive an MCCH message on the at least one MCCH provided through a first beam of a plurality of beams associated with the BS. For example, if the BS (or gNB) provides only two DL beams, e.g., beam 1 associated with SSB1 and beam 2 associated with SSB2, the UE may receive the MCCH message on an MCCH through beam 1 (e.g., SSB1 MCCH) and/or on an MCCH through beam 2 (e.g., SSB2 MCCH).

In action 1708, the UE may determine, according to the second CORESET configuration and the MCCH message, a plurality of MBS-specific CORESET groups in the second set of CORESETs. Each of the plurality of MBS-specific CORESET groups may correspond to a respective MBS session and may include at least two CORESETs configured to be provided through at least two different beams of the plurality of beams.

For example, each MBS-specific CORESET group may include a subset of the SSBn MTCHm CORESETs determined from the second CORESET configuration, where n is a variable depending on the number of SSBs associated with the DL beams of the BS, and m is a fixed value for each MBS-specific CORESET group. For example, the second set of CORESETs may include an MBS-specific CORESET group 1 corresponding to an MBS session 1 and an MBS-specific CORESET group 2 corresponding to an MBS session 2. If the BS (or gNB) provides only two DL beams, e.g., beam 1 associated with SSB1 and beam 2 associated with SSB2, the monitoring occasions of the CORESETs (or SSBn MTCHm CORESETs) in the MBS-specific CORESET group 1 may occur in the time domain based on the order: [SSB1 MTCH1 CORESET, SSB2 MTCH1 CORESET, SSB1 MTCH1 CORESET, SSB2 MTCH1 CORESET,]. Similarly, the monitoring occasions of the CORESETs (or SSBn MTCHm CORESETs) in the MBS-specific CORESET group 2 may occur in the time domain based on the order: [SSB1 MTCH2 CORESET, SSB2 MTCH2 CORESET, SSB1 MTCH2 CORESET, SSB2 MTCH2 CORESET, . . . ].

In some implementations, a first MBS-specific CORESET group (e.g., MBS-specific CORESET group 1) of the plurality of MBS-specific CORESET groups schedules a first set of the plurality of MTCHs for receiving data associated with a first MBS session (e.g., MBS session 1), and a second MBS-specific CORESET group (e.g., MBS-specific CORESET group 2) of the plurality of MBS-specific CORESET groups schedules a second set of the plurality of MTCHs for receiving data associated with a second MBS session (e.g., MBS session 2).

In some implementations, the UE may receive the data associated with the first MBS session on a first MTCH of the first set of the plurality of MTCHs, where the first MTCH may be provided through a second beam (e.g., beam 2) of the plurality of beams. The UE may further receive the data associated with the second MBS session on a second MTCH of the second set of the plurality of MTCHs, where the second MTCH is provided through a third beam of the plurality of beams, wherein the first beam is different from at least one of the second beam and the third beam.

In some implementations, the first beam may correspond to a first SSB with a first index (e.g., SSB1) and the second beam may correspond to a second SSB with a second index (e.g., SSB2) that is different from the first index. For example, the first MTCH may be an SSB2 MTCH1 on which the UE may receive data of MBS session 1 through beam 2 associated with SSB2. Given this, the (DL) beam for providing the data of MBS session 1 (e.g., the second beam) and the (DL) beam for providing the MCCH message (e.g., the first beam) are different. That is, the UE is enabled to be aware of where to receive an MTCH on another beam by deriving an MCCH message provided on a particular beam.

In some implementations, the first beam corresponds to a first SSB with a first index (e.g., SSB1) and the third beam corresponds to a second SSB with a second index that is the same as the first index (e.g., SSB1).

In some implementations, each of the plurality of MBS-specific CORESET groups is within a respective MTCH transmission window determined from the MCCH message. For example, the MTCH transmission window is a time period in which the CORESETs of the same MBS-specific CORESET group occupy in the time domain.

In some implementations, each of the plurality of beams corresponds to a respective SSB received from the BS within a beam-sweeping cycle. For example, if the BS (or gNB) provides only two (DL) beams, e.g., beam 1 and beam 2, within a beam-sweeping cycle, beam 1 may correspond to SSB1 and beam 2 may correspond to SSB2.

Consequently, the UE is enabled to determine where to receive the SSBn MCCH CORESETs and the SSBn MTCHm CORESET from the received system information. Further, the UE is capable of deriving MTCHs on different beams from an MCCH message provided on a particular beam. Given this, the signaling overhead of performing beam switching for deriving MTCHs on different beams can be reduced. Further, the UE is also enabled to switch the beam autonomously to receive the MTCH/MBS session data of interest, without receiving further beam switch commands from the BS.

Figure 18:
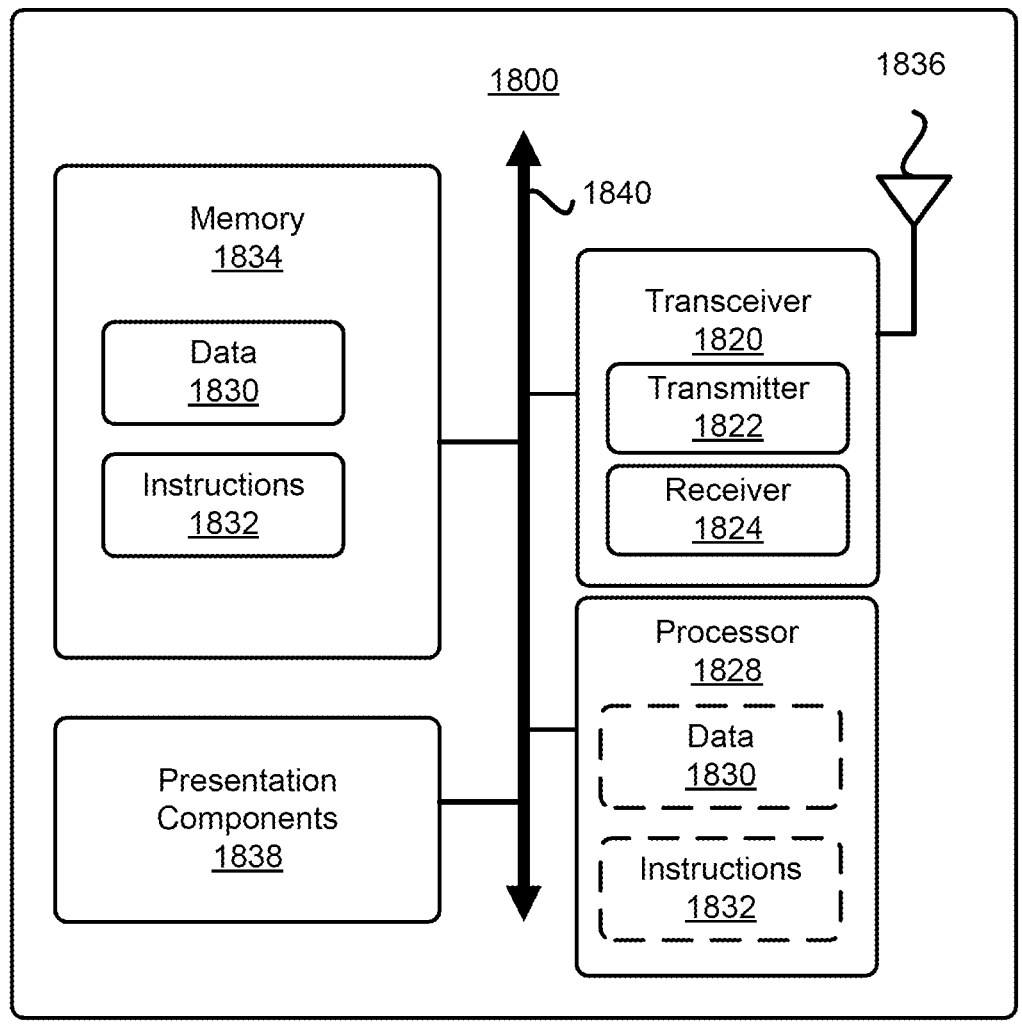
FIG. 18 is a block diagram illustrating a node for wireless communication according to an implementation of the present disclosure.

FIG. 18 is a block diagram illustrating a node 1800 for wireless communication according to an implementation of the present disclosure. As illustrated in FIG. 18, a node 1800 may include a transceiver 1820, a processor 1828, a memory 1834, one or more presentation components 1838, and at least one antenna 1836. The node 1800 may also include a radio frequency (RF) spectrum band module, a BS communications module, a network communications module, and a system communications management module, Input/Output (I/O) ports, I/O components, and a power supply (not illustrated in FIG. 18).

Each of the components may directly or indirectly communicate with each other over one or more buses 1840. The node 1800 may be a UE or a BS that performs various functions disclosed with reference to FIGS. 1 through 17.

The transceiver 1820 has a transmitter 1822 (e.g., transmitting/transmission circuitry) and a receiver 1824 (e.g., receiving/reception circuitry) and may be configured to transmit and/or receive time and/or frequency resource partitioning information. The transceiver 1820 may be configured to transmit in different types of subframes and slots including but not limited to usable, non-usable and flexibly usable subframes and slot formats. The transceiver 1820 may be configured to receive data and control channels.

The node 1800 may include a variety of computer-readable media. Computer-readable media may be any available media that may be accessed by the node 1800 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 1834 may include computer-storage media in the form of volatile and/or non-volatile memory. The memory 1834 may be removable, non-removable, or a combination thereof. Example memory may include solid-state memory, hard drives, optical-disc drives, etc. As illustrated in FIG. 18, the memory 1834 may store a computer-readable and/or computer-executable program 1832 (e.g., software codes or a set of instructions) that are configured to, when executed, cause the processor 1828 to perform various functions disclosed herein, for example, with reference to FIGS. 1 through 17. Alternatively, the program 1832 may not be directly executable by the processor 1828 but may be configured to cause the node 1800 (e.g., when compiled and executed) to perform various functions disclosed herein.

The processor 1828 (e.g., having processing circuitry) may include an intelligent hardware device, e.g., a Central Processing Unit (CPU), a microcontroller, an ASIC, etc. The processor 1828 may include memory. The processor 1828 may process the data 1830 and the program 1832 received from the memory 1838, and information transmitted and received via the transceiver 1820, the baseband communications module, and/or the network communications module. The processor 1828 may also process information to send to the transceiver 1820 for transmission via the antenna 1836 to the network communications module for transmission to a CN.

One or more presentation components 1838 may present data indications to a person or another device. Examples of presentation components 1838 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for Multicast/Broadcast Service (MBS) acquisition, the method comprising:
   receiving system information from a Base Station (BS);
   determining a first Control Resource Set (CORESET) configuration and a second CORESET configuration based on the system information, the first CORESET configuration for determining a first set of CORESETs scheduling at least one Multicast Control Channel (MCCH), the second CORESET configuration for determining a second set of CORESETs scheduling a plurality of Multicast Traffic Channels (MTCHs);
   receiving an MCCH message on the at least one MCCH provided through a first beam of a plurality of beams associated with the BS; and
   determining based on the second CORESET configuration and the MCCH message, a plurality of MBS-specific CORESET groups in the second set of CORESETs,
   wherein;
   each of the plurality of MBS-specific CORESET groups corresponds to a respective MBS session and comprises at least two CORESETs configured to be provided through at least two different beams of the plurality of beams,
   a first MBS-specific CORESET group of the plurality of MBS-specific CORESET groups schedules a first set of the plurality of MTCHs for receiving data associated with a first MBS session, and
   a second MBS-specific CORESET group of the plurality of MBS-specific CORESET groups schedules a second set of the plurality of MTCHs for receiving data associated with a second MBS session.

2. The method of claim 1, further comprising:
   receiving the data associated with the first MBS session on a first MTCH of the first set of the plurality of MTCHs, the first MTCH being provided through a second beam of the plurality of beams; and
   receiving the data associated with the second MBS session on a second MTCH of the second set of the plurality of MTCHs, the second MTCH being provided through a third beam of the plurality of beams,
   wherein the first beam is different from at least one of the second beam and the third beam.

3. The method of claim 2, wherein the first beam corresponds to a first Synchronization Signal Block (SSB) with a first index, and the second beam corresponds to a second SSB with a second index that is different from the first index.

4. The method of claim 2, wherein the first beam corresponds to a first Synchronization Signal Block (SSB) with a first index, and the third beam corresponds to a second SSB with a second index that is the same as the first index.

5. The method of claim 1, wherein each of the plurality of MBS-specific CORESET groups is within a respective MTCH transmission window determined from the MCCH message.

6. The method of claim 1, wherein each of the plurality of beams corresponds to a respective Synchronization Signal Block (SSB) received from the BS within a beam-sweeping cycle.

7. A User Equipment (UE) for Multicast/Broadcast Service (MBS) acquisition, the UE comprising:
   at least one non-transitory computer-readable medium storing one or more computer executable instructions; and
   at least one processor coupled to the at least one non-transitory computer-readable medium and configured to execute the one or more computer-executable instructions to cause the UE:
   receive system information from a Base Station (BS);

determine a first Control Resource Set (CORESET) configuration and a second CORESET configuration based on the system information, the first CORESET configuration for determining a first set of CORESETs scheduling at least one Multicast Control Channel (MCCH), the second CORESET configuration for determining a second set of CORESETs scheduling a plurality of Multicast Traffic Channels (MTCHs);

receive an MCCH message on the at least one MCCH provided through a first beam of a plurality of beams associated with the BS; and determine, based on the second CORESET configuration and the MCCH message, a plurality of MBS-specific CORESET groups in the second set of CORESETs, wherein:

each of the plurality of MBS-specific CORESET groups corresponds to a respective MBS session and comprises at least two CORESETs configured to be provided through at least two different beams of the plurality of beams, a first MBS-specific CORESET group of the plurality of MBS-specific CORESET groups schedules a first set of the plurality of MTCHs for receiving data associated with a first MBS session, and a second MBS-specific CORESET group of the plurality of MBS-specific CORESET groups schedules a second set of the plurality of MTCHs for receiving data associated with a second MBS session.

8. The UE of claim 7, wherein the at least one processor is further configured to execute the one or more computer-executable instructions to cause the UE:

receive the data associated with the first MBS session on a first MTCH of the first set of the plurality of MTCHs, the first MTCH being provided through a second beam of the plurality of beams; and receive, by the transmission and reception circuitry, the data associated with the second MBS session on a second MTCH of the second set of the plurality of MTCHs, the second MTCH being provided through a third beam of the plurality of beams, wherein the first beam is different from at least one of the second beam and the third beam.

9. The UE of claim 8, wherein the first beam corresponds to a first Synchronization Signal Block (SSB) with a first index, and the second beam corresponds to a second SSB with a second index that is different from the first index.

10. The UE of claim 8, wherein the first beam corresponds to a first Synchronization Signal Block (SSB) with a first index, and the third beam corresponds to a second SSB with a second index that is the same as the first index.

11. The UE of claim 7, wherein each of the plurality of MBS-specific CORESET groups is within a respective MTCH transmission window determined from the MCCH message.

12. The UE of claim 7, wherein each of the plurality of beams corresponds to a respective Synchronization Signal Block (SSB) received from the BS within a beam-sweeping cycle.

* * * * *